(12) United States Patent
Zeng et al.

(10) Patent No.: US 12,355,850 B2
(45) Date of Patent: Jul. 8, 2025

(54) METHOD AND APPARATUS FOR OBTAINING INSTALLATION INFORMATION OF NETWORK ACCESS DEVICE

(71) Applicant: HUAWEI TECHNOLOGIES CO., LTD., Guangdong (CN)

(72) Inventors: Yongbo Zeng, Shenzhen (CN); Hongyue Wang, Shenzhen (CN); Cheng Qin, Beijing (CN); Hui Jin, Shenzhen (CN); Lingjun Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/909,133

(22) PCT Filed: Mar. 5, 2021

(86) PCT No.: PCT/CN2021/079219
§ 371 (c)(1),
(2) Date: Sep. 2, 2022

(87) PCT Pub. No.: WO2021/175307
PCT Pub. Date: Sep. 10, 2021

(65) Prior Publication Data
US 2023/0104681 A1  Apr. 6, 2023

(30) Foreign Application Priority Data

Mar. 6, 2020 (CN) .......................... 202010152236.2
Aug. 27, 2020 (CN) .......................... 202010877355.4

(51) Int. Cl.
*H04L 67/52* (2022.01)
*H04L 67/025* (2022.01)
(Continued)

(52) U.S. Cl.
CPC ............ *H04L 67/52* (2022.05); *H04L 67/025* (2013.01); *H04W 48/14* (2013.01); *H04W 64/003* (2013.01)

(58) Field of Classification Search
CPC ... H04W 64/00; H04W 64/003; H04W 48/14; H04W 24/02; H04W 88/08; H04W 4/02;
(Continued)

(56) References Cited

U.S. PATENT DOCUMENTS 10,091,662 B1 * 10/2018 Bendlin ................ H04W 24/02
10,560,204 B1   2/2020 Patel et al.
(Continued)

FOREIGN PATENT DOCUMENTS

CN   104038948 A   9/2014
CN   104854901 A   8/2015
(Continued)

*Primary Examiner* — Siu M Lee
(74) *Attorney, Agent, or Firm* — WOMBLE BOND DICKINSON (US) LLP

(57) ABSTRACT

A method and an apparatus for obtaining installation information of a network access device. The network access device may be CPE. When a user installs the CPE, after the user uses a terminal device to send a request for obtaining installation information of the CPE to a network device, and to receive the installation information of the CPE that is fed back by the network device, the received installation information of the CPE can be displayed on a display interface.

20 Claims, 22 Drawing Sheets

(51) Int. Cl.
*H04W 48/14* (2009.01)
*H04W 64/00* (2009.01)

(58) Field of Classification Search
CPC ............... H04W 4/025; H04L 51/0806; H04L 51/0853; H04L 51/0889; H04L 51/24; H04L 67/025; H04L 67/52
See application file for complete search history.

(56) References Cited

U.S. PATENT DOCUMENTS

| | | |
|---|---|---|
| 12,039,315 B2 * | 7/2024 | Pal ....................... H04N 21/443 |
| 2012/0040663 A1 | 2/2012 | Kamdar et al. |
| 2012/0040664 A1 | 2/2012 | Kamdar et al. |
| 2017/0026110 A1 * | 1/2017 | Richardson .......... H01Q 1/1257 |
| 2018/0049150 A1 * | 2/2018 | Chandwani ........... H04W 76/10 |
| 2019/0058533 A1 | 2/2019 | Ghosh et al. |

FOREIGN PATENT DOCUMENTS

| | | | | |
|---|---|---|---|---|
| CN | 105072681 A | 11/2015 | | |
| CN | 105307182 A | 2/2016 | | |
| WO | WO-2016164042 A1 * | 10/2016 | ............ | H04W 16/18 |
| WO | WO-2020130267 A1 * | 6/2020 | ............ | G06Q 10/101 |

\* cited by examiner

Application scenario A

Application scenario B

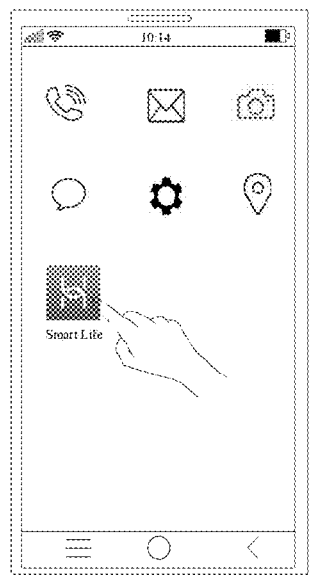 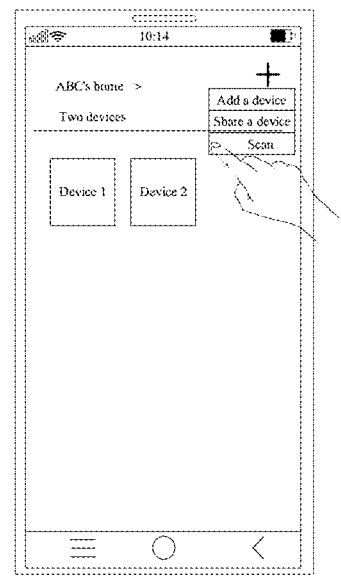
FIG. 6-1A    FIG. 6-1B
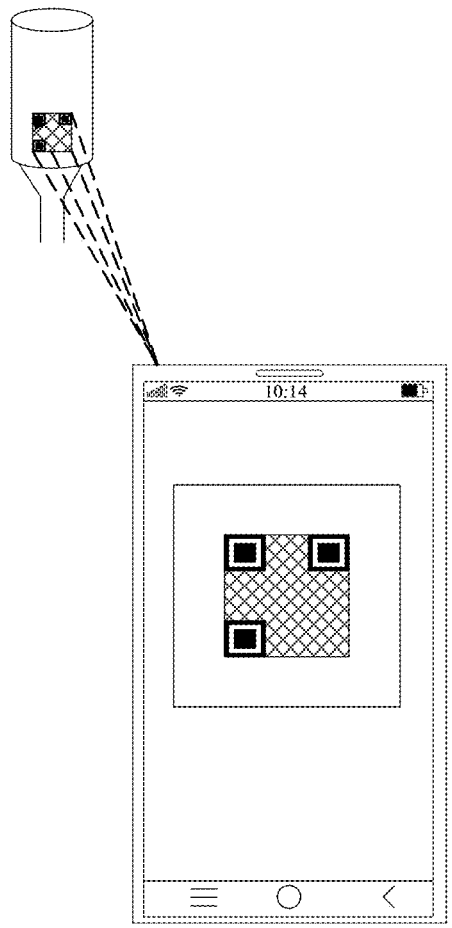 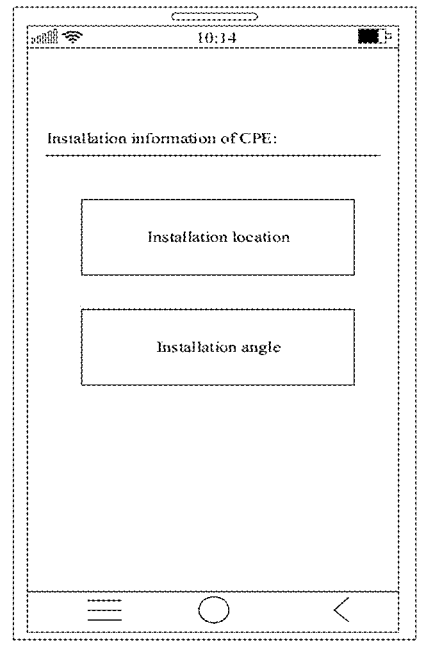
FIG. 6-1C    FIG. 6-1D

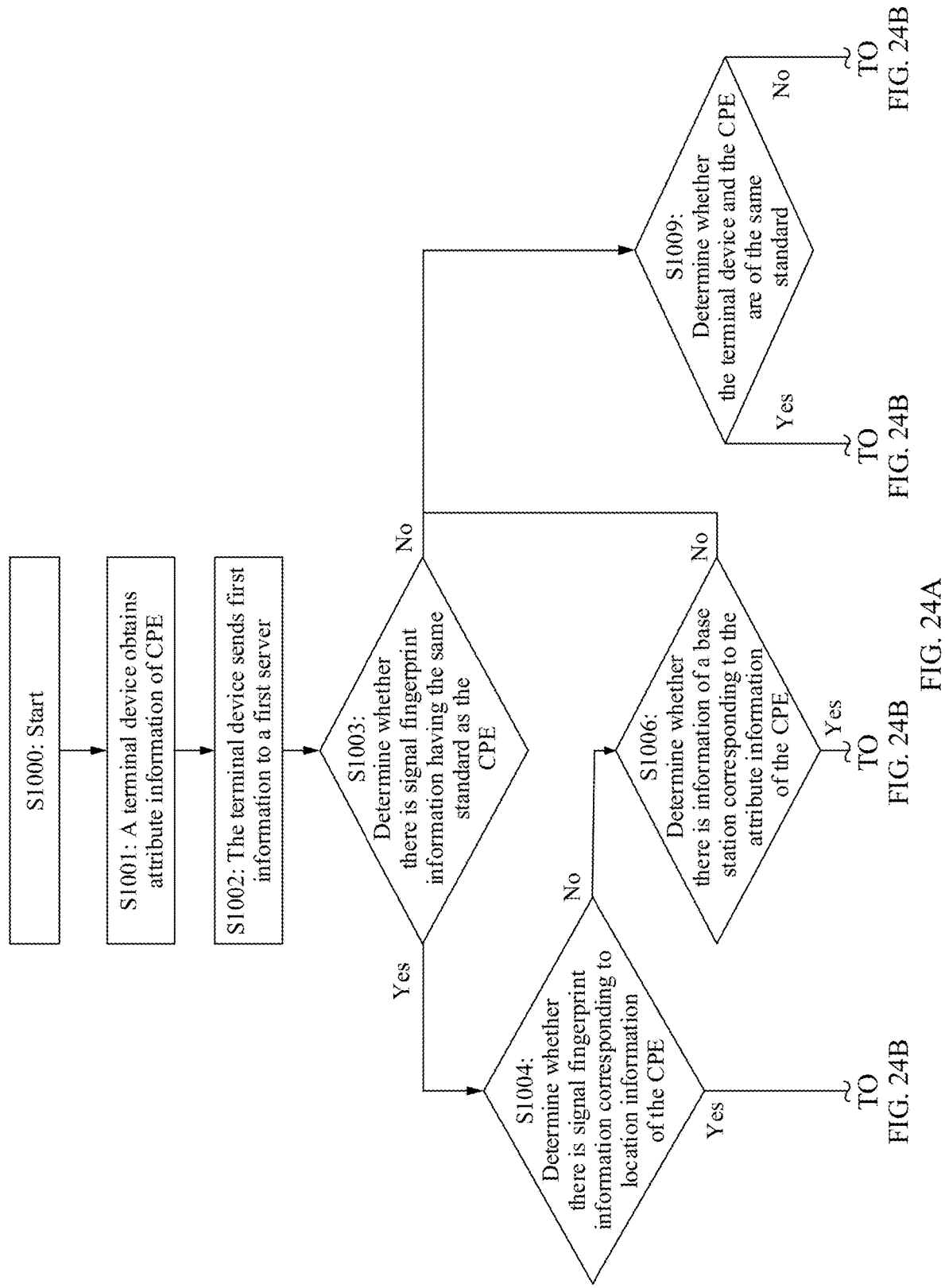

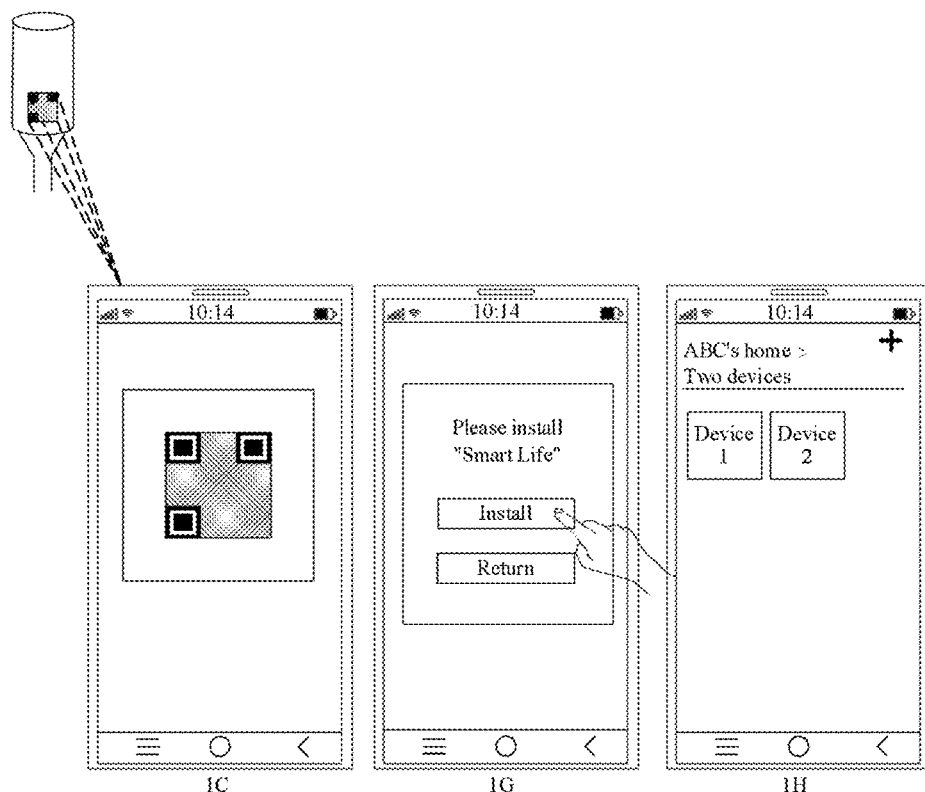
FIG. 26
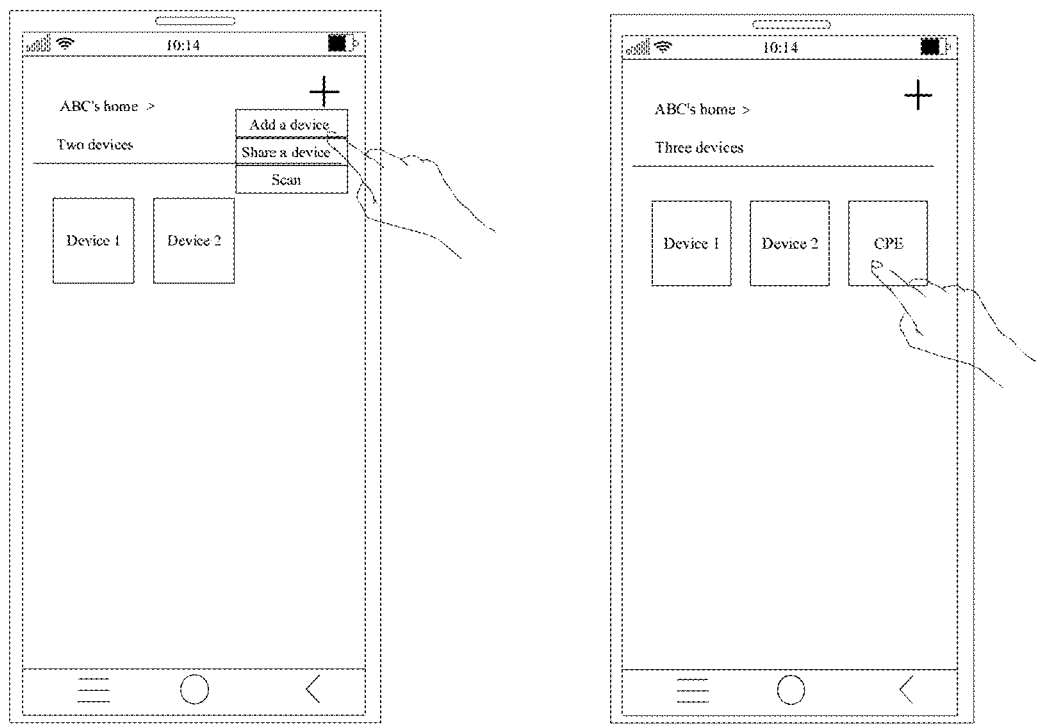
FIG. 27-1H
FIG. 27-1J

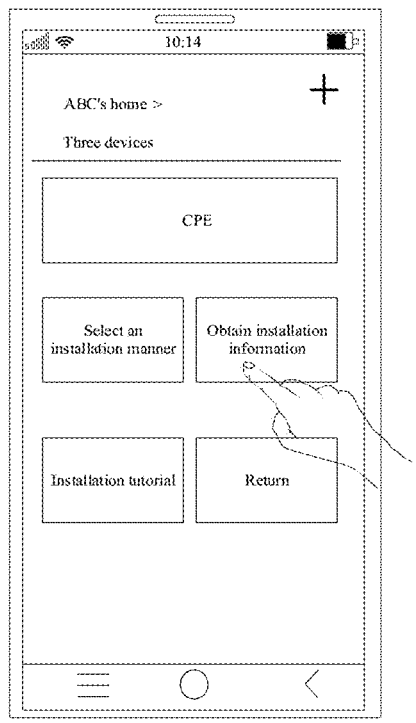 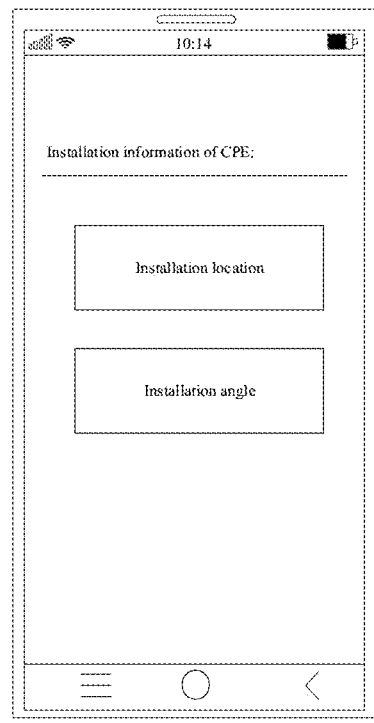
FIG. 27-1K  FIG. 27-1D
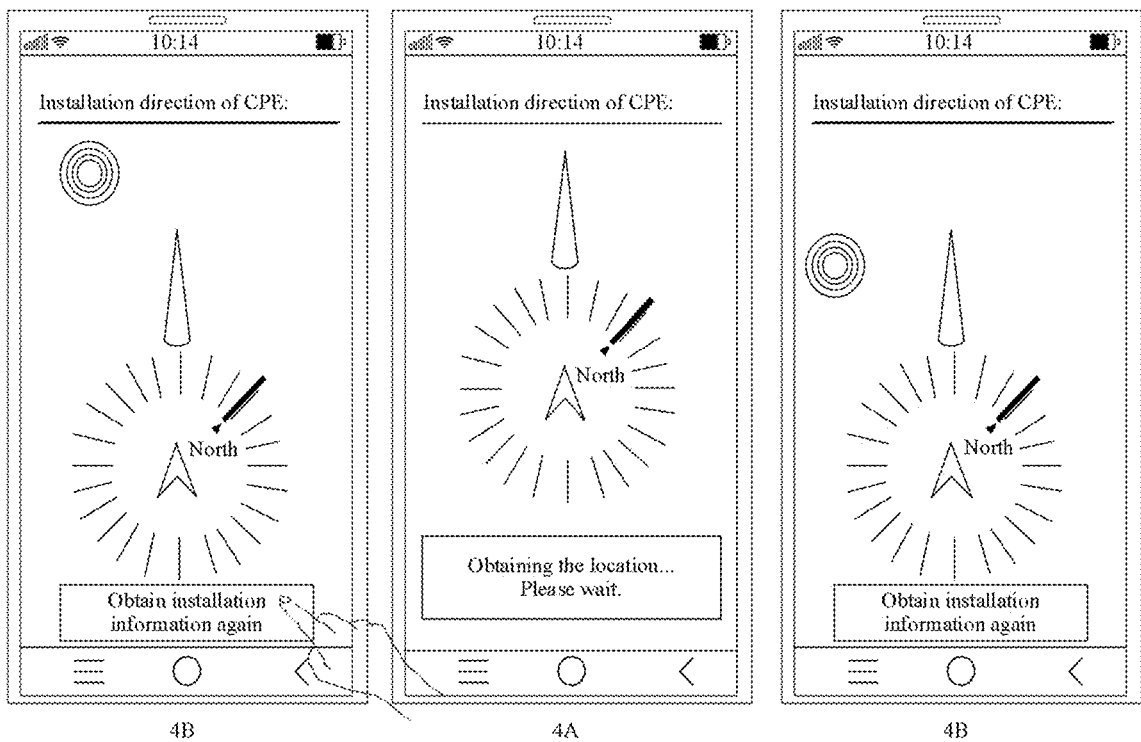
FIG. 28

METHOD AND APPARATUS FOR OBTAINING INSTALLATION INFORMATION OF NETWORK ACCESS DEVICE

CROSS REFERENCE TO RELATED APPLICATIONS

This application is a national stage of International Application No. PCT/CN2021/079219, filed on Mar. 5, 2021, which claims priority to Chinese Patent Application No. 202010152236.2, filed on Mar. 6, 2020, and Chinese Patent Application No. 202010877355.4, filed on Aug. 27, 2020. All of the aforementioned applications are incorporated herein by reference in their entireties.

TECHNICAL FIELD

This application relates to the field of communications technologies, and in particular, to a method and an apparatus for obtaining installation information of a network access device.

BACKGROUND

Customer premises equipment (CPE) is a device that can convert a cellular signal into an Ethernet signal/wireless fidelity (Wi-Fi) signal. The customer premises equipment can provide an Internet access service for another terminal device, and is widely used in areas with sparse population distribution such as rural areas, towns, hospitals, organizations, and factories. After one CPE is installed in these areas, terminal devices in these areas can access the Internet via the CPE. This saves costs of deploying a dedicated wired network to access the Internet in these areas with sparse population distribution.

In a conventional technology, a larger signal strength indicates higher quality of a cellular signal received by the CPE, and an installation location, an installation direction, and an angle of the CPE directly affect a strength of a received cellular signal, and accordingly affect quality of an Internet service provided by the CPE for the terminal device. Therefore, before using the CPE, a user without related knowledge needs to hire professional installation personnel carrying a professional test device, to measure cellular signals in an area in which the CPE needs to be installed, and finally determine a location with a largest received cellular signal strength in the area as the installation location of the CPE.

Therefore, in the conventional technology, after purchasing the CPE, the user cannot use the CPE immediately, and needs to hire professional installation personnel to perform installation and wait for an on-site service of the installation personnel. As a result, time costs and labor costs consumed in an installation process before the user uses the CPE are relatively high.

SUMMARY

This application provides a method and an apparatus for obtaining installation information of a network access device, to resolve technical problems in the conventional technology that time costs and labor costs are relatively high in an installation process of a network access device such as CPE.

According to a first aspect of the application, a method for obtaining installation information of a network access device is provided, which may be applied to a terminal device. The terminal device may send a request for obtaining installation information of a network access device to a network device, and after receiving the installation information of the network access device that is fed back by the network device, display the received installation information of the network access device on a display interface. In this way, a user can complete installation of the network access device based on the installation information of the network access device that is displayed by the terminal device, and ensure communication quality of the network access device as much as possible. According to the method and the apparatus provided in this application, the user can obtain the installation information of the network access device and complete installation of the network access device by using the terminal device, so that time costs and labor costs consumed during installation of the network access device before the user uses the network access device can be reduced, and user experience during the installation of the network access device is improved.

In an embodiment of the first aspect of the application, after receiving the installation information of the network access device, the terminal device displays, on the display interface, a first icon of a movement direction from a current location of the terminal device to a recommended installation location of the network access device, to indicate a movement direction of the user; and/or the terminal device may further display, on the display interface, a second icon indicating a rotation direction from an angle toward which the terminal device currently faces to a recommended installation angle of the network access device, to indicate a rotation direction of the user. Finally, when the user may perform selection more intuitively based on icons of the terminal device, namely, the first icon and the second icon that are displayed on the display interface of the terminal device, the user may indicate the network access device to move to the installation location and rotate to the installation angle. Therefore, in this embodiment, when the user installs the network access device, a degree of intelligence of viewing the installation information of the network access device can be further improved, and user experience is further improved.

In an embodiment of the first aspect of the application, on a basis that the terminal device displays the first icon and/or the second icon, when the location of the terminal device carried with the user moves, the terminal device updates the first icon based on the current location and the installation location, so that the terminal device continuously indicates the user by using the first icon, until the user reaches the installation location based on the indication of the first icon. Similarly, when the angle toward which the terminal device carried with the user changes, the terminal device updates the second icon based on the angle toward which the terminal device currently faces and the installation angle, so that the terminal device continuously indicates the user by using the second icon. Therefore, in this embodiment, in an entire movement process of the user, a prompt of a latest movement direction and a latest rotation angle can be provided for the user in real time, to maintain real-time performance of the first icon and the second icon, improve accuracy of indication for the user, and further improve user experience.

In an embodiment of the first aspect of the application, after the user carries the terminal device to move to the installation location and faces the installation angle, the terminal device may display installation confirmation information of the network access device on the display interface. In this case, the first icon or the second icon may not be displayed, so that the user determines, based on the installation confirmation information of the network access device, to install the network access device at the current location and angle. In this embodiment, a prompt is further provided after the user moves to the installation location and the installation angle based on the installation confirmation information of the network access device, so that the user can determine the current location more intuitively, to improve the degree of intelligence.

In an embodiment of the first aspect of the application, because the network device determines the installation information of the network access device based on attribute information of the network access device and positioning data, the request for obtaining the installation information of the network access device that is sent by the terminal device to the network device may further carry the attribute information of the network access device. In addition, the attribute information of the network access device is obtained by the terminal device by scanning a graphic identification code on the network access device, and/or the attribute information of the network access device may be entered by the user. In this embodiment, after scanning the graphic identification code by using the terminal device, the user can directly obtain the attribute information of the network access device, or input some attribute information. This can improve a degree of intelligence of obtaining the attribute information of the network access device, and further reduce operations of the user when the user obtains the installation information of the network access device. In addition, when the user does not need to have more professional knowledge to determine the attribute information of the network access device, the user can also determine the attribute information of the network access device in a manner of scanning the graphic identification code. Such an operation is simple and easy to implement, and also facilitates promotion and application of the method in this embodiment.

In an embodiment of the first aspect of the application, the attribute information of the network access device includes at least one of the following: identification information of the network access device, a public land mobile network PLMN to which a subscriber identity module SIM card used by the network access device belongs, a tracking area code TAC of a location of the network access device, a radio access technology RAT type supported by the network access device, a device model of the network access device, device capability information of the network access device, and an installation range specified by the user of the network access device. In this embodiment, the attribute information of the network access device may be carried in the request for obtaining the installation information of the network access device that is sent by the terminal device to the network device, or may be carried in other information for sending, so that the network device can determine the installation information of the network access device based on the attribute information of the network access device and the positioning data. In addition, the attribute information of the network access device may be used by the network device to determine the installation information of the network access device more accurately. This improves accuracy of the determined installation information.

In an embodiment of the first aspect of the application, the request for obtaining the installation information of the network access device further includes information used to indicate a relative location between the terminal device and a target object, for example, a relative location between the terminal device and a building. In this case, the installation location in the installation information of the network access device that is determined by the network device based on the positioning data, the relative location, and the attribute information of the network access device may be a relative location between a current location of the terminal device and the target object. According to the method provided in this embodiment, the installation location in the installation information of the network access device that is received by the terminal device can be the relative location relative to the target object, so that it is ensured that the network access device is not blocked by the target object when receiving the cellular signal, and communication quality of the network access device is ensured as much as possible. Therefore, this embodiment can enrich application scenarios of the obtained installation information of the network access device, and further refine the installation location in the installation information of the network access device. On the basis of improving the communication quality of the network access device, a more intuitive installation indication can be further provided for the user by using the relative location, which further improves user experience.

In an embodiment of the first aspect of the application, the network access device may be configured to receive a cellular signal, convert the received cellular signal into an Ethernet signal or a wireless fidelity Wi-Fi signal, and output the Ethernet signal or the Wi-Fi signal; and/or the network access device includes customer premises equipment CPE.

According to a second aspect of the application, a method for obtaining installation information of a network access device is provided, which may be applied to a network device. The network device may be a first server. After the network device receives a request for obtaining installation information of a network access device that is sent by a terminal device, and determines the installation information of the network access device based on positioning data of the terminal device and attribute information of the network access device, the network device sends the installation information of the network access device to the terminal device, so that a user of the terminal device can complete installation of the network access device based on the installation information of the network access device that is displayed by the terminal device, and communication quality of the network access device is ensured as much as possible. In addition, in this embodiment, the network device may determine the installation information of the network access device, and does not need other installation personnel to manually determine the installation information of the network access device. On the basis of reducing time costs and labor costs consumed when the user installs the network access device before using the network access device, a degree of automation during determining of the installation information of the network access device is further improved, and execution efficiency of the entire method for obtaining installation information of a network access device is improved.

In an embodiment of the second aspect of the application, because the network device determines the installation information of the network access device based on the attribute information of the network access device and the positioning data, the request for obtaining the installation information of the network access device that is received by the network device and that is sent by the terminal device may further carry the attribute information of the network access device. Therefore, in this embodiment, the network device can also receive the attribute information of the network access device when receiving the request for obtaining the installation information of the network access device. Therefore, a degree of intelligence and efficiency of obtaining the attribute information of the network access device can be improved. Such an operation is simple and easy to implement, and also facilitates promotion and application of the method in this embodiment.

In an embodiment of the second aspect of the application, the attribute information of the network access device includes at least one of the following: identification information of the network access device, a public land mobile network PLMN to which a subscriber identity module SIM card used by the network access device belongs, a tracking area code TAC of a location of the network access device, a radio access technology RAT type supported by the network access device, a device model of the network access device, device capability information of the network access device, and an installation range specified by the user of the network access device. In this embodiment, the attribute information of the network access device may be carried in the request for obtaining the installation information of the network access device that is sent by the terminal device to the network device, or may be carried in other information for sending, so that the network device can determine the installation information of the network access device based on the attribute information of the network access device and the positioning data. In addition, the attribute information of the network access device may be used by the network device to determine the installation information of the network access device more accurately. This improves accuracy of the determined installation information.

In an embodiment of the second aspect of the application, after receiving the request for obtaining the installation information of the network access device that is sent by the terminal device, the network device obtains calculated data that meets a condition. The calculated data includes reference signal receiving power reported by another terminal device within a preset range of location information requested by the terminal device and corresponding location information. In addition, a direction of arrival of each base station at a current location of the positioning data of the terminal device is estimated by using reference signal receiving power at different locations, to obtain directions of arrival of different base stations at the current location, and further determine an optimal installation location and an installation angle within a specified installation range of the network access device specified by the user. Therefore, according to the method for obtaining installation information of a network access device provided in this embodiment, the installation information of the network access device can be determined by using signal fingerprint information provided by the terminal device. Because the collected signal fingerprint information is reported by another terminal device, signal strengths at different locations can be represented more effectively, so that the installation information of the network access device that is finally determined by the network device is more suitable for actual application, and the practicability of the determined installation information of the network access device is improved.

In an embodiment of the second aspect of the application, after receiving the request for obtaining the installation information of the network access device that is sent by the terminal device, the network device may directly obtain calculated data that meets a condition. The calculated data includes location information of a base station to which all cells that meet the condition and that are within coverage of a current location of the terminal device belong, so that the network device can relatively directly determine a location of the base station, and determine an optimal installation location and an installation angle within a specified installation range of the network access device specified by the user. Therefore, according to the method for obtaining installation information of a network access device provided in this embodiment, the installation information of the network access device can be determined based on information of the base station. Because the information of the base station is relatively fixed and reliable, the installation information of the network access device can be determined more directly without depending on information reported by the terminal device. Therefore, an amount of data that needs to be collected when the network device determines the installation information of the network access device is reduced, and a calculation amount is reduced. This improves calculation efficiency when the installation information of the network access device is determined.

In an embodiment of the second aspect of the application, the request for obtaining the installation information of the network access device further includes information used to indicate a relative location between the terminal device and a target object, for example, a relative location between the terminal device and a building. In this case, the installation location in the installation information of the network access device that is determined by the network device based on the positioning data, the relative location, and the attribute information of the network access device may be a relative location between a current location of the terminal device and the target object. According to the method provided in this embodiment, the installation location in the installation information of the network access device that is received by the terminal device can be the relative location relative to the target object, so that it is ensured that the network access device is not blocked by the target object when receiving the cellular signal, and communication quality of the network access device is ensured as much as possible. Therefore, this embodiment can enrich application scenarios of the obtained installation information of the network access device, and further refine the installation location in the installation information of the network access device. On the basis of improving the communication quality of the network access device, a more intuitive installation indication can be further provided for the user by using the relative location, which further improves user experience.

In an embodiment of the second aspect of the application, the network access device may be configured to receive a cellular signal, convert the received cellular signal into an Ethernet signal or a wireless fidelity Wi-Fi signal, and output the Ethernet signal or the Wi-Fi signal; and/or the network access device includes customer premises equipment CPE.

According to a third aspect of the application, an apparatus for obtaining installation information of a network access device is provided, which may be configured to perform the method for obtaining installation information of a network access device according to the first aspect of the application. The apparatus for obtaining installation information of a network access device provided in this embodiment includes a transceiver module and a processing module.

The transceiver module is configured to send a request for obtaining installation information of a network access device to a network device. The request for obtaining the installation information of the network access device includes positioning data of the terminal device. The transceiver module is further configured to receive the installation information of the network access device that is sent by the network device. The installation information of the network access device is used to indicate at least one of the following: an installation location of the network access device and an installation angle of the network access device, and the installation location of the network access device and the installation angle of the network access device are determined by the network device based on the positioning data. The processing module is configured to display the installation information of the network access device on a display interface.

In an embodiment of the third aspect of the application, the processing module is configured to display, on the display interface, a first icon used to indicate a movement direction from a location of the terminal device to the installation location and/or a second icon used to indicate a rotation direction from an angle toward which the terminal device faces to the installation angle.

In an embodiment of the third aspect of the application, the processing module is further configured to: when the location of the terminal device changes, update, according to the change of the location, the first icon displayed on the display interface; and/or when the angle toward which the terminal device faces changes, update, according to the change of the angle, the second icon displayed on the display interface.

In an embodiment of the third aspect of the application, the processing module is further configured to display installation confirmation information of the network access device on the display interface when the terminal device moves to the installation location and rotates to the installation angle.

In an embodiment of the third aspect of the application, after the processing module determines that the terminal device receives the installation information of the network access device that is sent by the network device, if a movement distance exceeds a preset distance, the transceiver module is further configured to send a request for obtaining installation information of the network access device to the network device again, and receive the installation information of the network access device that is sent by the network device again.

In an embodiment of the third aspect of the application, the request for obtaining the installation information of the network access device further includes attribute information of the network access device. The apparatus further includes a scanning module and/or an input module. The scanning module is configured to obtain the attribute information of the network access device by scanning a graphic identification code provided on the network access device. The input module is configured to obtain the attribute information of the network access device by receiving data entered by a user.

In an embodiment of the third aspect of the application, the attribute information of the network access device includes at least one of the following: identification information of the network access device, a public land mobile network PLMN to which a subscriber identity module SIM card used by the network access device belongs, a tracking area code TAC of a location of the network access device, a radio access technology RAT type supported by the network access device, a device model of the network access device, device capability information of the network access device, and an installation range specified by the user of the network access device.

In an embodiment of the third aspect of the application, the request for obtaining the installation information of the network access device further includes information used to indicate a relative location between the terminal device and a target object. The installation information of the network access device is further used to indicate a relative installation location between the network access device and the target object.

According to a fourth aspect of the application, an apparatus for obtaining installation information of a network access device is provided, which may be configured to perform the method for obtaining installation information of a network access device according to the second aspect of this application. The apparatus for obtaining installation information of a network access device provided in this embodiment includes a transceiver module and a processing module.

The transceiver module is configured to receive a request for obtaining installation information of a network access device that is sent by a terminal device. The request for obtaining the installation information of the network access device includes positioning data of the terminal device. The processing module is configured to determine the installation information of the network access device based on the positioning data and attribute information of the network access device. The installation information of the network access device is used to indicate at least one of the following: an installation location of the network access device and an installation angle of the network access device. The transceiver module is further configured to send the installation information of the network access device to the terminal device.

In an embodiment of the fourth aspect of the application, the request for obtaining the installation information of the network access device further includes the attribute information of the network access device.

In an embodiment of the fourth aspect of the application, the attribute information of the network access device includes at least one of the following: identification information of the network access device, a public land mobile network PLMN to which a subscriber identity module SIM card used by the network access device belongs, a tracking area code TAC of a location of the network access device, a radio access technology RAT type supported by the network access device, a device model of the network access device, device capability information of the network access device, and an installation range specified by the user of the network access device.

In an embodiment of the fourth aspect of the application, the processing module is configured to: obtain, based on the positioning data and within a preset range of a location of the terminal device, signal strength information reported by at least one device corresponding to the attribute information of the network access device; determine, based on the signal strength information reported by the at least one device, direction information and a signal strength that are of at least one base station corresponding to the location of the terminal device; and determine, based on the direction information and the signal strength information that are of the at least one base station, that the installation information of the network access device is location information of a target location point and information about an angle between a direction toward which the target location point faces and a target base station. The target location point is a location point that has a maximum signal strength, that is of the at least one base station, and that is within the installation range specified by the user of the network access device and within the preset range.

In an embodiment of the fourth aspect of the application, the processing module is configured to: obtain, based on the positioning data and within a preset range of a location of the terminal device, location information of at least one base station corresponding to the attribute information of the network access device; and determine, based on the location information of the at least one base station, that the installation information of the network access device is location information of a target location point and information about an angle between a direction toward which the target location point faces and a target base station. The target location point is a location that is closest to the at least one base station and that is within the installation range specified by the user of the network access device and within the preset range.

In an embodiment of the fourth aspect of the application, the request for obtaining the installation information of the network access device further includes information used to indicate a relative location between the terminal device and a target object. The installation information of the network access device is further used to indicate a relative installation location between the network access device and the target object.

According to a fifth aspect, an embodiment of the application provides a communications apparatus, including a processor and a communications interface. The processor sends data through the communications interface. The processor is configured to implement the method performed by the terminal device in the first aspect.

In an embodiment, the communications apparatus further includes a memory. The memory is configured to store program code, and the processor executes the program code stored in the memory, so that the communications apparatus performs the method performed by the terminal device in the first aspect.

According to a sixth aspect, an embodiment of the application provides a communications apparatus, including a processor and a communications interface. The processor sends data through the communications interface. The processor is configured to implement the method performed by the network device in the second aspect.

In an embodiment, the communications apparatus further includes a memory. The memory is configured to store program code, and the processor executes the program code stored in the memory, so that the communications apparatus performs the method performed by the network device in the second aspect.

According to a seventh aspect, the application provides a system for obtaining installation information of a network access device, including the communications apparatus according to any one of the embodiments of the third aspect of the application as a terminal device, and the communications apparatus according to any one of the embodiments of the fourth aspect of the application as a network device.

BRIEF DESCRIPTION OF DRAWINGS

FIG. 6-1A to FIG. 6-1D are schematic diagrams of an embodiment of display interfaces of a terminal device according to an embodiment of the application;

FIG. 7-1A' to FIG. 7-1C' are schematic diagrams of an embodiment of display interfaces of a terminal device according to an embodiment of the application;

FIG. 24A and FIG. 24B are a schematic flowchart of an embodiment of a method for obtaining installation information of CPE according to an embodiment of the application;

FIG. 26 is a schematic diagram of an embodiment of display interfaces of a terminal device according to an embodiment of the application;

FIG. 27-1H, FIG. 27-1J, FIG. 27-1K, and FIG. 27-1D are schematic diagrams of an embodiment of display interfaces of a terminal device according to an embodiment of the application;

FIG. 28 is a schematic diagram of an embodiment of display interfaces of a terminal device according to an embodiment of the application;

DESCRIPTION OF EMBODIMENTS

Figure 1:
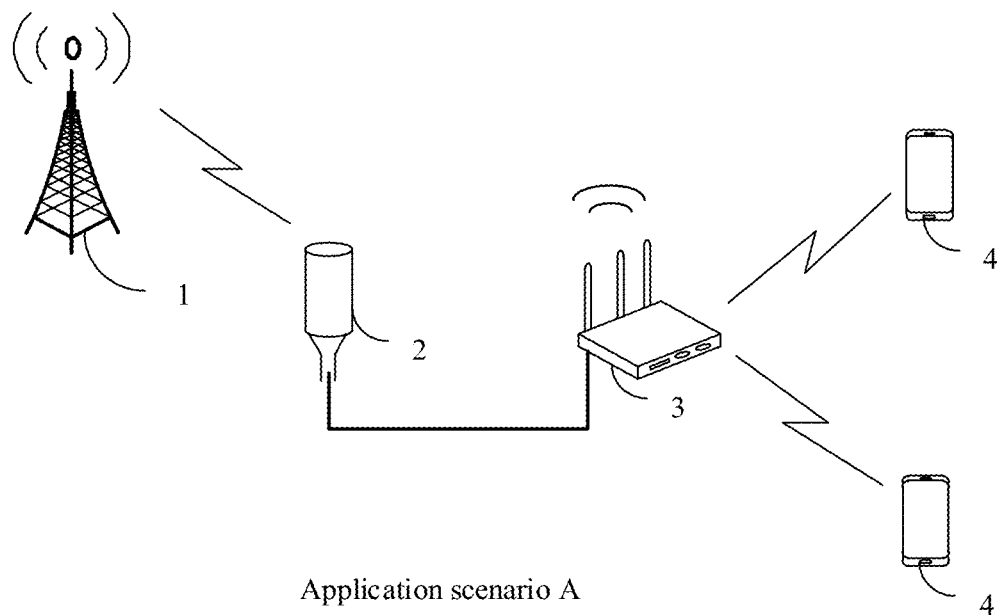
FIG. 1 is a schematic diagram of a technical background to which this application is applied.
Figure 1:
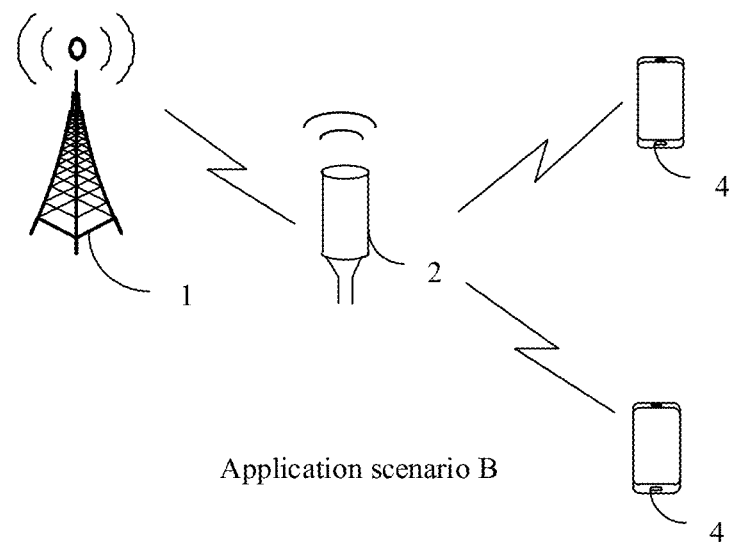

FIG. 1 is a schematic diagram of a technical background to which this application is applied. A network access device in this application is a device that can convert a cellular signal into an Ethernet signal/wireless fidelity (Wi-Fi) signal, and can provide an Internet access service for another terminal device. Based on the feature that the network access device can be installed outdoors and provide the Internet service by receiving the cellular signal, the network access device is widely used in areas with sparse population distribution such as rural areas, towns, hospitals, organizations, and factories. After one network access device is installed in these areas, terminal devices in these areas can access the Internet via the network access device. This saves costs of deploying a dedicated wired network to access the Internet in these areas with sparse population distribution. In an embodiment, the network access device may be an electronic device that can receive a cellular signal of a base station and convert the cellular signal into an Ethernet signal/Wi-Fi signal, such as customer premises equipment (CPE), a smartphone, a relay device, or a wireless router. For ease of understanding, in embodiments of this application, an example in which the network access device is CPE is used for description, instead of limiting implementation of the network access device.

For example, in an application scenario A of the CPE shown in FIG. 1, CPE 2 may receive a cellular signal of a base station 1, convert the cellular signal into an Ethernet signal, and send the Ethernet signal to a router 3 through an Ethernet cable. The router 3 provides an Internet service for a plurality of terminal devices 4 that access the router 3. Alternatively, in another application scenario B of the CPE shown in FIG. 1, CPE 2 may have a related function of a router. In this case, after receiving a cellular signal from a base station 1, the CPE 2 may convert the cellular signal into a Wi-Fi signal, and provide a Wi-Fi hotspot to directly provide an Internet service for a plurality of terminal devices 4 that access the Wi-Fi hotspot provided by the CPE 2. The cellular signal may also be referred to as a cellular network signal, a mobile network signal, or the like. Common cellular networks include: a global system for mobile communications (GSM/2G) communications network, a third generation (3G) communications network, a long term evolution (LTE/4G) communications network, a 5th generation mobile communications technology (5th generation mobile network, 5th generation wireless system, or 5th-Generation, 5G) communications network, and the like.

Because quality of a cellular signal received by CPE directly affects quality of an Internet service provided by the CPE for a terminal device, the CPE can be used only after being disposed within coverage of a base station that provides the cellular signal. When the CPE is within coverage of a plurality of base stations, a base station with a strongest cellular signal received by the CPE may be further determined, and a receiving direction of the CPE is disposed towards the base station, to maximize a strength of a cellular signal that can be received by the CPE. The receiving direction of the CPE may be a direction that a receive antenna of the CPE faces, and the CPE can receive the cellular signal in the direction that the receive antenna of the CPE faces. The receiving direction of the CPE may alternatively be a direction that a receive beam directivity pattern of the CPE faces.

Figure 2:
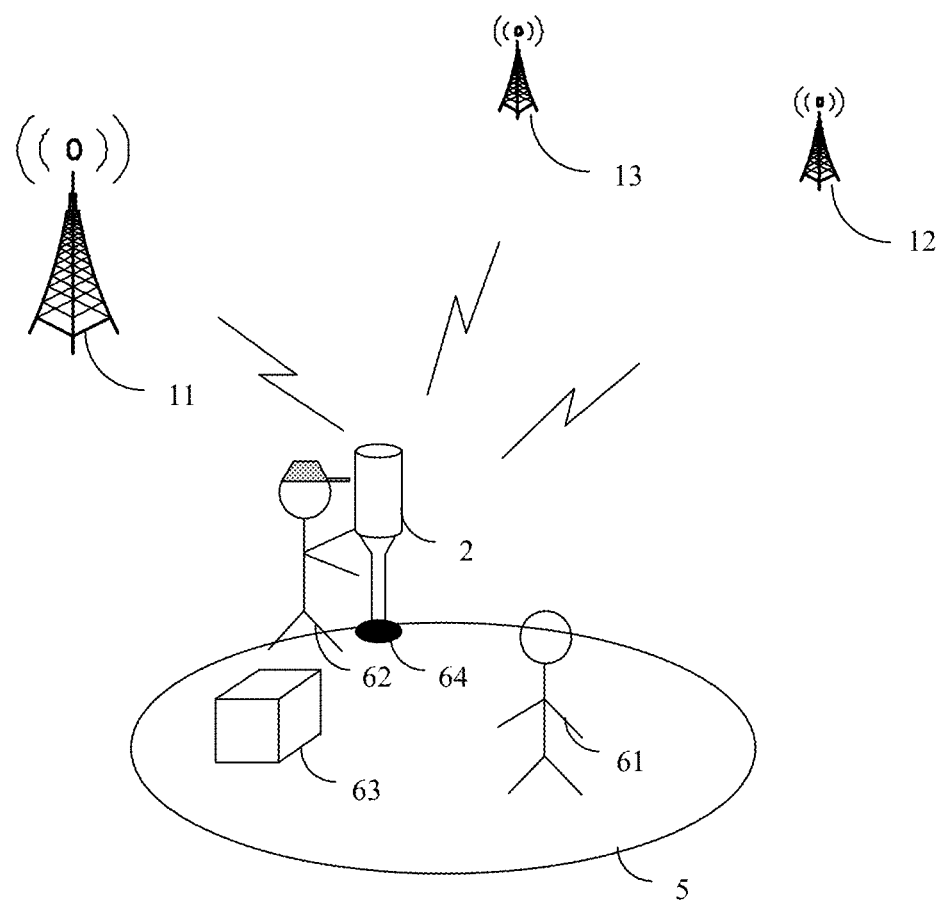
FIG. 2 is a schematic diagram of a CPE installation process.

FIG. 2 is a schematic diagram of a CPE installation process. As shown in FIG. 2, when a user 61 needs to install one CPE in an area 5, the area 5 is within coverage of three base stations: a base station 11, a base station 12, and a base station 13, but the user cannot determine distances from the nearby base stations, and does not know an orientation of each base station or transmit beam directions of cells carried by the base stations. As a result, an optimal installation location and an installation angle of the CPE cannot be determined. In this case, to install the CPE, the user 61 needs to hire professional installation personnel 62 carrying a professional test device 63, to detect parameters such as strengths of cellular signals from different base stations and transmit beams in the area 5, to finally determine that when the CPE is installed at a location point 64 in the area 5 and a receiving direction of the CPE is set to face the base station 11, a strength of a cellular signal that can be received is the largest.

However, in the CPE installation process shown in FIG. 2, after purchasing the CPE, the user cannot use the CPE immediately, and still needs to hire the professional installation personnel to perform detection and installation and wait for an on-site service of the installation personnel. As a result, time costs and labor costs consumed in an installation process before the user uses the CPE are relatively high.

Therefore, to reduce time costs and labor costs consumed when a user installs a device such as CPE, this application provides a method and an apparatus for obtaining installation information, so that the user can obtain installation information of the device without hiring installation personnel, and install the device by the user based on the installation information of the device. The method provided in this application may be used to obtain installation or placement information of devices such as CPE, a smartphone, a relay station, and a wireless router, so that after a direction in which a received signal is strongest is obtained, the devices are placed in corresponding proper locations and/or directions.

Figure 3:
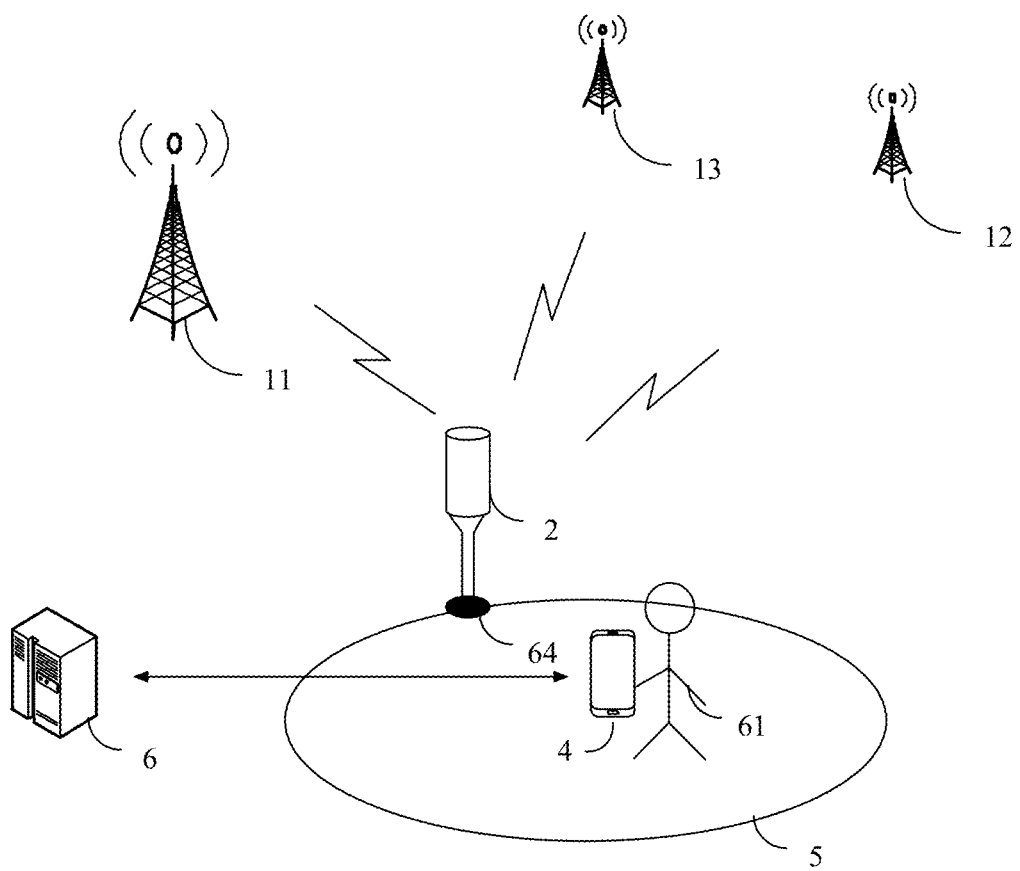
FIG. 3 is a schematic diagram of a CPE installation process according to an embodiment of the application.

FIG. 3 is a schematic diagram of a CPE installation process according to an embodiment of the application. In FIG. 3, when a user 61 needs to install a second device 2 in an area 5, the user 61 may directly obtain installation information of the second device 2 by using a first device 4 carried with the user 61, and the obtained installation information of the second device 2 may be obtained by the first device 4 from a third device 6. The installation information of the second device 2 includes one or more of information such as absolute location information (for example, longitude and latitude data) and relative location information (for example, a distance and an angle relative to a specified point) of a location point 64 in the area 5, and an angle set when a receiving direction of the second device 2 when the second device 2 receives a cellular signal of a base station faces the base station 11. Subsequently, the user 61 may install, based on the installation information of the second device 2 obtained by the first device 4, the second device 2 at the location point 64 in the area 5, and set the receiving direction of the second device 2 to face the base station 11, to implement that the second device 2 is installed at a location at which a strength of a received cellular signal is the largest. In this process, neither the installation personnel 62 in FIG. 2 nor the detection of the related professional test device 63 is required. After the user 61 obtains the installation information of the second device 2 from the third device 6 by using the first device 4 such as a mobile phone carried with the user 61, installation may be performed based on the installation information of the second device 2. This reduces time costs and labor costs consumed before the user uses the second device 2, and improves use experience of the user.

In an embodiment, the first device 4 in this embodiment of this application may be an electronic device that can be carried with a user, such as a mobile phone, a tablet computer, or a notebook computer. The electronic device may also be referred to as a terminal device. The second device 2 may be a network device such as CPE, a smartphone, a relay device, or a wireless router that can receive a cellular signal of a base station, or a network access device such as a network relay device. The third device 6 may be a device, for example, a computer, a server, or a workstation that is disposed on a network side by a provider of the installation information of the second device 2, or another device having computing, storage, and communications capabilities. The third device may also be referred to as a network device.

With reference to the accompanying drawings, the following describes a implementation process of a method for obtaining installation information of a network access device (CPE is used as an example) according to an embodiment of the application by using an example in which the network access device is the CPE. The following several embodiments may be combined with each other, and same or similar concepts or processes may not be described again in some embodiments. In addition, it may be understood that the CPE used as an example in the embodiments of this application may be equivalently replaced with any other network access device, and implementations and principles of the embodiments of this application remain unchanged after the replacement.

Figure 4:
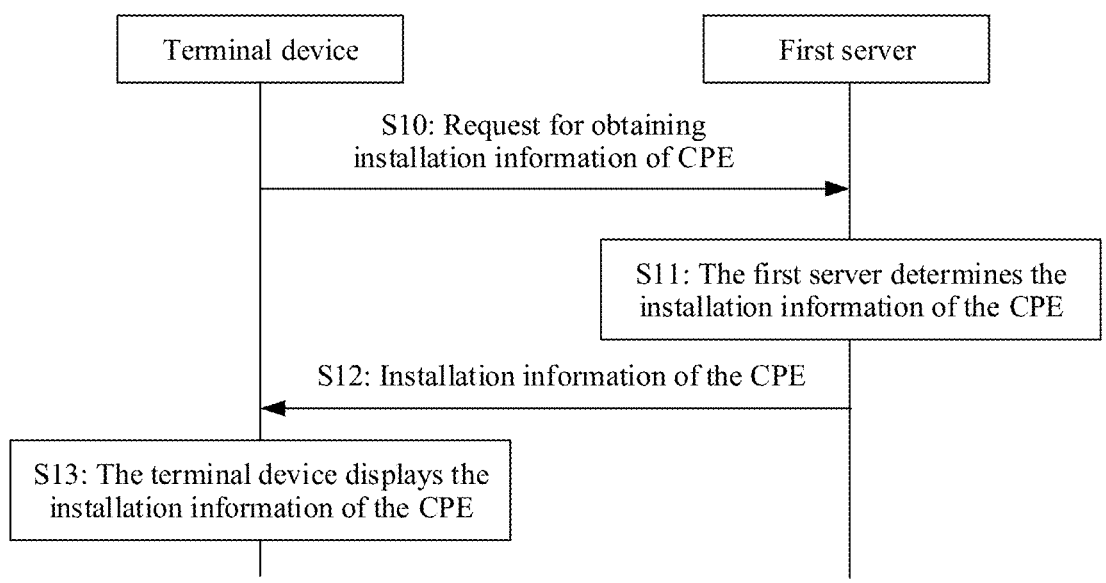
FIG. 4 is a schematic flowchart of an embodiment of a method for obtaining installation information of CPE according to an embodiment of the application.

FIG. 4 is a schematic flowchart of an embodiment of a method for obtaining installation information of CPE according to an embodiment of the application. The method may be applied to a process shown in FIG. 3. FIG. 4 shows interaction between the first device 4 and the third device 6 in a process in which the first device 4 obtains the installation information of the second device 2 from the third device 6 in FIG. 3. In this embodiment, an example in which the first device 4 is a terminal device such as a mobile phone carried with the user, the second device 2 is CPE, and the third device 6 is a first server is used for description instead of limitation. The second device 2 may alternatively be any other device that needs to be installed, the terminal device may communicate with the first server by using a cellular network provided by a base station. The method for obtaining installation information of CPE according to an embodiment shown in FIG. 4 includes the following operations.

S10: The terminal device sends a request for obtaining installation information of CPE to the first server. The request for obtaining the installation information of the CPE may be used to request the first server to obtain the installation information of the CPE to be installed. An implementation of the request for obtaining the installation information of the CPE is not limited in this embodiment. The request may be implemented by using a preset bit carried in a message sent by the terminal device to the first server, and is recorded as first information.

For example, when the user needs to install the CPE before using the CPE, the user may send the request for obtaining the installation information of the CPE to the first server via the carried terminal device, to request to obtain the installation information of the CPE used by the user. To enable the first server to be capable of determining the installation information of the CPE more accurately, the request for obtaining the installation information of the CPE may include location information used to indicate a current location of the terminal device, or may include attribute information of the CPE to be installed. The location information may be positioning data of a location of the terminal device, and the positioning data is represented by using longitude and latitude. Alternatively, the location information may be information about a cell on which the terminal device camps or that the terminal device accesses, and the information about the cell is represented by using a cell identifier (for example, Cell Global Identifier, cell global identifier).

In an embodiment, the attribute information of the CPE may include location information and identification information that carries the CPE. The identification information of the CPE is, for example, information that can identify the CPE, such as a serial number of the CPE and an international mobile equipment identity (IMEI). After the first server receives the request for obtaining the installation information of the CPE, the attribute information of the CPE may be further determined based on the identification information of the CPE in the request for obtaining the installation information of the CPE. Therefore, an amount of information carried in the request for obtaining the installation information of the CPE is reduced, and efficiency of communication between the terminal device and the first server is improved.

S11: The first server determines the installation information of the CPE.

For example, after receiving the request for obtaining installation of the CPE that is sent by the terminal device in S10, the first server determines, based on the request, installation information of a device installed by the user of the terminal device. The installation information of the CPE is used to indicate at least one of the following: an installation location of the CPE, an installation angle of the CPE, a location of a base station, and the like. A physical base station may include one or more logical cells. Each cell has unique cell identity within a PLMN range. A signal covering a cellular cell is transmitted by the base station. Therefore, determining a signal source location of each cell is determining a location of a base station that carries the cell. For example, in an example, the first server may determine, based on PLMN information supported by the CPE in the request for obtaining installation of the CPE, a cell or a base station that may provide a cellular signal for the CPE, and based on location information requested in the request for obtaining installation of the CPE, determine that when the CPE is installed 10 m north of the current location of the terminal device in a direction of 45 degrees west of north, a strength of a cellular signal that can be received by the CPE from a cell or base station near the location of the terminal device is the largest. In another example, the first server may determine, based on a PLMN supported by the CPE in the request for obtaining installation of the CPE, a cell or a base station that may provide a cellular signal for the CPE, and based on location information carried in the request for obtaining installation of the CPE, determine that when the CPE is installed at the current location of the terminal device in a direction of 45 degrees west of north, a strength of a cellular signal that can be received by the CPE from a cell or base station near the location of the terminal device is the largest. In another example, the first server may determine, based on a PLMN supported by the CPE in the request for obtaining installation of the CPE, a cell or a base station that may provide a cellular signal for the CPE, and determine, based on location information carried in the request for obtaining installation of the CPE and at a current location of the terminal device, a location of a cell or a base station with a largest strength of a cellular signal that can be received by the CPE. The location of the cell or the base station may be an absolute geographical location or a relative geographical location relative to the terminal device. In another example, the first server may determine, based on PLMN information supported by the CPE and one or more types of attribute information (for example, a RAT type supported by the CPE) of the CPE in the request for obtaining installation of the CPE, a cell or a base station that may provide a cellular signal for the CPE.

S12: The first server sends the installation information of the CPE to the terminal device.

Subsequently, the first server sends, to the terminal device, the installation information of the CPE that is determined by the first server in S11.

In an embodiment, two or more terminal devices may request to obtain installation information of a same CPE from the first server at the same time. In this case, after the first server receives the request for obtaining the installation information of the CPE that is sent by the terminal device in S10, before S11 and S12, it may be further determined whether other terminal devices also send requests for obtaining installation information of the CPE. If no, S11 and S12 continue to be performed. If yes, the first server may select one terminal from the terminals that send the requests for obtaining the installation information of the CPE to reply to the request information. For example, the first server may select a first received obtaining request according to a sequence of receiving the requests for obtaining the installation information of the CPE, and S11 and S12 are performed in sequence, to determine the installation information of the CPE based on the request for obtaining the installation information of the CPE from a selected terminal device.

S13: The terminal device displays the installation information of the CPE on a display interface.

For example, after receiving the installation information of the CPE that is returned by the first server, the terminal device may display the installation information of the CPE on the display interface of the terminal device, so that a user of the terminal device can view the installation information of the CPE through the display interface, and according to an indication of the installation information of the CPE, install the CPE at a proper location and in a receiving direction.

In an embodiment, in S13, the terminal device may further output the received installation information of the CPE to the user in other manners. For example, the terminal device may play a voice of the installation information of the CPE through a loudspeaker; or the terminal device may display the installation information of the CPE for the user in three-dimensional space in an artificial intelligence (AI) manner such as augmented reality (augmented reality, AR) and virtual reality (VR).

Therefore, in the entire CPE installation process, the user may determine the installation information of the CPE based on an indication of the installation information of the CPE displayed on the display interface of the terminal device after sending the request for obtaining the installation information of the CPE through the terminal device such as a mobile phone carried with the user. After the user completes installation of the CPE based on the installation information of the CPE, the CPE may implement a largest strength of cellular signals received in an area in which the user needs to install the CPE, thereby ensuring communication quality of the CPE as much as possible. Compared with the conventional technology, the user may complete the installation of the CPE, especially selection of the installation location and the installation angle in the installation process, so that the user does not need to hire a professional operator to complete the installation of the CPE in the installation manner shown in FIG. 2. Therefore, time costs and labor costs consumed when the user installs the CPE before using the CPE are reduced, and user experience when the CPE user installs the CPE is improved.

Figure 5:
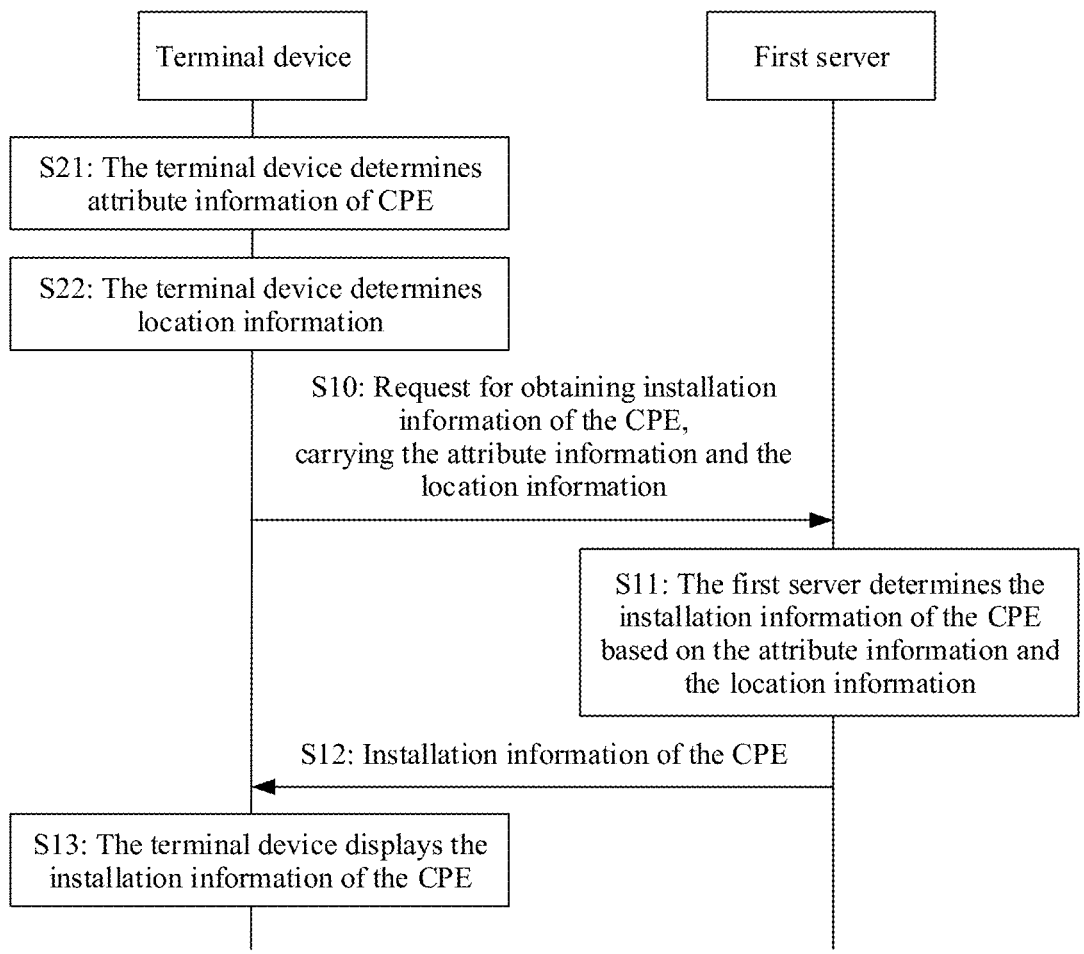
FIG. 5 is a schematic flowchart of an embodiment of a method for obtaining installation information of CPE according to an embodiment of the application.

Further, in the foregoing embodiment, because the terminal device needs to carry the location information of the terminal device and the attribute information of the CPE in the request for obtaining the installation information of the CPE, FIG. 5 is a schematic flowchart of an embodiment of a method for obtaining installation information according to an embodiment of the application. Based on FIG. 4, in the embodiment shown in FIG. 5, before the terminal device sends a request for obtaining installation information of CPE to the first server in S10, the terminal device may further determine the attribute information of the CPE in S21, and determine the location information in S22.

The attribute information of the CPE includes at least one type shown in Table 1: information about a public land mobile network (PLMN) to which a subscriber identity module (SIM) card used by the CPE belongs, a tracking area code (TAC) of a location of the CPE, a radio access technology (RAT) type supported by the CPE, a device model of the CPE, a capability parameter (for example, CPE key competency) of the CPE, and the like.

TABLE 1

| Attribute Information | Description of the attribute information | Function |
|---|---|---|
| PLMN | PLMN to which the SIM card used by the CPE belongs | Used by the first server to determine a cell or a base station to which signal fingerprint information belongs; or used by the first server to determine a cell or a base station |
| TAC | Tracking area in which a location of the CPE is located | Used to narrow down a search range of signal fingerprint information |
| RAT type | RAT type supported by the CPE | Used by the first server to determine a cell or a base station to which signal fingerprint information belongs; or used by the first server to determine a cell or a base station |
| CPE key competency | Part of CPE capability parameters | Used by the first server to determine a cell or a base station to which signal fingerprint information belongs; or used by the first server to determine a cell or a base station |

For example, the PLMN may be information about a carrier to which the SIM card of the CPE belongs. The CPE may be connected to a base station of a corresponding carrier to receive and send a signal. For example, when being used, the CPE receives a cellular signal sent by a base station of a carrier 1 or a cellular signal sent by a base station of a carrier 2. According to ITU-T specifications, the PLMN consists of a mobile country code (MCC) and a mobile network code (MNC). The mobile country code is represented by three decimal digits, and the mobile network code is represented by two or three decimal digits. For example, PLMN 46000 indicates a carrier network in China. The RAT type may be a communications mode such as 2G, 3G, 4G, 5G, or a next-generation mobile communications system. The CPE key competency may be a part of the CPE capability parameters, such as a frequency band band supported by the CPE, a supported frequency, or whether the CPE supports a 4G wireless access network and 5G NR dual connectivity (EUTRA-NR dual connection, EN-DC) function. The tracking area, TAC or TA for short, is an area in which a terminal device can perform communications (paging, location update, or the like). After a carrier classifies different terminal devices into different TACs, load balancing and a TAC location update signaling procedure can be facilitated, and management and control are easier. Therefore, terminal devices of different carriers may be classified into different TACs. When the attribute information of the CPE includes the TAC of the CPE, the first server may search the signal fingerprint information for signal fingerprint information corresponding to the TAC of the CPE, thereby narrowing down a signal fingerprint information searching range. The CPE capability parameters (capability) include at least the following: a frequency band range, a power level, whether CA is supported, a supported security algorithm, and the like. The CPE key competency described in this application may be a part of the foregoing capability parameters. For example, the frequency band range of the CPE may be used as the CPE key competency. For example, the attribute information such as a PLMN, a RAT type, a TAC, and a CPE key competency of the CPE may be used by the first server to determine signal fingerprint information of a cell or a base station that can be used by the CPE, or determine a base station of a bearing cell that can be used by the CPE (for details, refer to embodiments shown in FIG. 12 and FIG. 13).

In an embodiment, the attribute information of the CPE carried in the request for obtaining the installation information of the CPE may be provided by a graphic identification code (such as a two-dimensional code) of the CPE, or may be entered by a user of the terminal device, or may be obtained by the terminal device from a server through a network. Alternatively, the attribute information is obtained by combining the foregoing at least two manners. For example, a part of the attribute information is entered by the user of the terminal device, and the part of the attribute information is obtained by the terminal device by scanning the graphic identification code of the CPE. For example, the two-dimensional code of the CPE may provide attribute information such as a RAT type of the CPE and a key capability of the CPE. However, because a PLMN used by the CPE involves services provided by different carriers and charging requirements, the user needs to perform selection. In another example, the two-dimensional code of the CPE may be associated with an Internet link that provides attribute information such as a RAT type of the CPE and a CPE key competency, so that the attribute information may be obtained by using the Internet link. However, because a PLMN used by the CPE involves services provided by different carriers and charging requirements, the user needs to perform selection.

For example, in order to enable the user to obtain the attribute information of the CPE more directly after obtaining the CPE, the graphic identification code of the CPE may be printed or pasted on the CPE, or printed at a location such as an instruction manual or a packing box of the CPE, or sent by a seller to the user through a network. The graphic identification code may be provided by a supplier of the CPE. In an embodiment, the graphic identification code carries the attribute information of the CPE. For example, when the PLMN in the attribute information of the CPE is "46000", the supplier of the CPE may use a tool such as a two-dimensional code generator to generate a two-dimensional code carrying the five digits "46000". Subsequently, after the user scans the two-dimensional code by using the terminal device, the terminal device may obtain information about "46000" from the two-dimensional code. Alternatively, in an embodiment, the graphic identification code carries an address at which the attribute information of the CPE is stored. For example, the supplier of the CPE stores the attribute information of the CPE in a server disposed in the Internet, and uses a tool such as a two-dimensional code generator to generate a two-dimensional code according to an address "192.168.xxx.xxx" of the server (Note: xxx is an uncertain general meaning). Subsequently, after the user scans the two-dimensional code by using the terminal device, the terminal device may obtain the address of the server from the two-dimensional code, and further access the server in the Internet according to the obtained address, and then obtains the attribute information of the CPE stored in the server.

Figures 1A, 1B, 1C, 7:
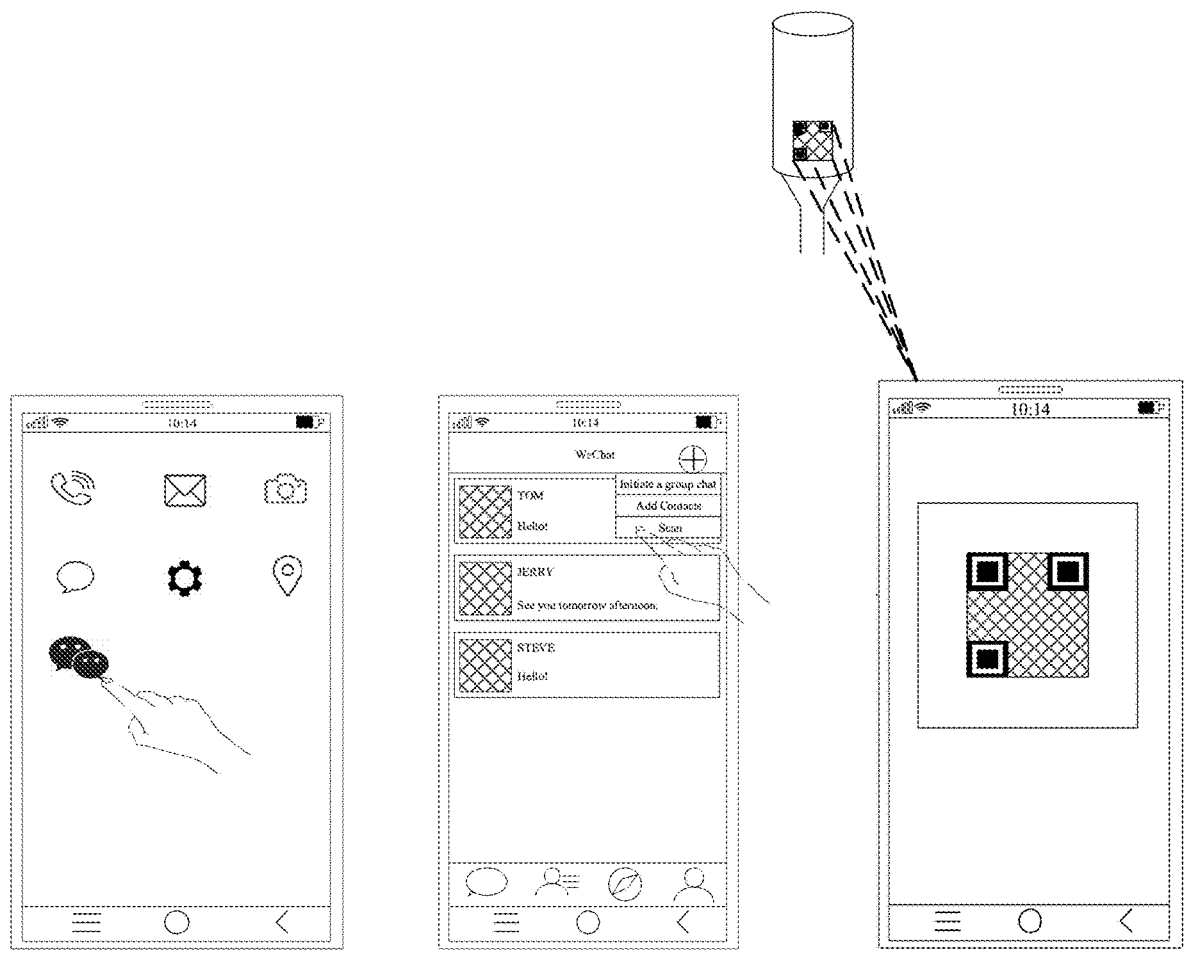

For example, when the attribute information of the CPE is carried by a two-dimensional code, FIG. 6-1A to FIG. 6-1D are schematic diagrams of an embodiment of display interfaces of a terminal device according to an embodiment of this application, and FIG. 6-1A to FIG. 6-1D show an implementation in which a user operates the terminal device to obtain the attribute information of the CPE by using the two-dimensional code. An application "Smart Life" that can send a request for obtaining the installation information of the CPE is installed on the terminal device, and the application may be an Android installation package (Android package, APK). On a display interface shown in FIG. 6-1A, the user may tap an icon of the application "Smart Life" on the display interface to start the application. In a subsequent display interface 1B, the user may invoke a camera of the terminal device by tapping "Scan" on the display interface of the application. In a display interface 1C, the user aligns the camera of the terminal device with the two-dimensional code of the CPE to be installed and scans the two-dimensional code, so that the terminal device obtains, by using the two-dimensional code, the attribute information of the CPE that the user needs to install, to implementing that the terminal device obtains the attribute information of the CPE in S21. FIG. 7-1A' to FIG. 7-1C' are schematic diagrams of an embodiment of display interfaces of a terminal device according to an embodiment of this application. FIG. 7-1A' to FIG. 7-1C' show another embodiment in which a user operates a terminal device to obtain attribute information of CPE by using a two-dimensional code, and may be used as an equivalent replacement solution for the display interfaces shown in FIG. 6-1A to FIG. 6-1C. An application that has a "Scan" function, such as WeChat and Alipay, is installed on the terminal device. On a display interface 1A' shown in FIG. 7-1A' to FIG. 7-1C', the user may tap the application "WeChat" on the display interface, and in a subsequent display interface 1B', the user may tap "Scan" on the WeChat display interface to invoke a camera of the terminal device. In a display interface 1C', the user aligns the camera of the terminal device with the two-dimensional code of the CPE to be installed and scans the two-dimensional code, so that the terminal device can also obtain, by using the two-dimensional code, the attribute information of the CPE that the user needs to install.

In an embodiment, in the instance shown in FIG. 6-1A to FIG. 6-1D, before sending the request for obtaining the installation information of the CPE to the first server in S10, the terminal device may further determine the location information of the terminal device in S22, before installing the CPE, the user uses the terminal device to obtain the installation information of the CPE. Therefore, the location information of the terminal device can be used to indicate a geographical location of an area in which the user plans to install the CPE. The terminal device may determine longitude and latitude data of a current location of the terminal device by invoking an internal global positioning system (GPS) receiving module or a BeiDou signal receiving module of the terminal device; or the terminal device may determine current location information of the terminal device by using a received Wi-Fi signal; or the terminal device may determine current location information of the terminal device by using a received cellular signal; or the terminal device may determine current location information by using one or a combination of a plurality of signals of a received Wi-Fi signal, a Bluetooth signal, an ultra wideband (UWB) signal, another short-range communications signal, and a cellular signal.

The location information may be a circular area in which a geographical location (for example, a geographical location indicated by longitude and latitude data) of a location point at which the terminal device used by the user is currently located is a circle center and a radius is R. In this case, the location information may be obtained by the terminal device by invoking a related positioning module in the terminal device before the terminal device sends the request for obtaining the installation information of the CPE; or the location information may be entered by the user of the terminal device, or may be determined and stored by the terminal device in advance. Alternatively, the location information may be a rectangular area indicated by longitude and latitude data of two or four location points. In this case, the location information may be entered by the user of the terminal device, or may be determined and stored by the terminal device in advance. In addition, the location information may include only geographical location information of a location point at which the terminal device used by the user is currently located, the radius R is determined and stored by a network side device in advance, and the radius R is not transmitted in the location information. A shape and a representation manner of a location at which the user expects to install the CPE are not limited in this embodiment of this application. In the embodiment shown in FIG. 3, an example in which the user expects to install the CPE in a circular area is used for description.

Further, in the embodiment shown in FIG. 4 or FIG. 5, S21 and S22 are not performed in sequence, or may be performed by the terminal device at the same time. After the terminal device obtains the attribute information of the CPE by using S21 and obtains the location information by using S22, that is, the request for obtaining the installation information of the CPE may be sent to the first server, and the request for obtaining the installation information of the CPE carries the attribute information and the location information of the CPE.

For example, in an embodiment shown in FIG. 6-1A to FIG. 6-1D, after scanning the two-dimensional code on the display interface shown in FIG. 6-1C, the terminal device may send the request for obtaining the installation information of the CPE to the first server. Subsequently, after receiving the installation information of the CPE sent by the first server, the terminal device may display the installation information of the CPE in the display interface 1D. For example, the terminal device may display, in a form of text, that the installation location of the CPE is 10 m north, and that the installation angle is 45 degrees west of north. That is, for the user using the terminal device, after scanning the two-dimensional code of the CPE through the display interface 1C of the terminal device, the user can view, through the display interface 1D of the terminal device, the installation information of the CPE displayed by the terminal device. Processes in which the terminal device sends a request for obtaining the installation information of the CPE to the first server and receives the installation information of the CPE are invisible to the user of the terminal device. Intuitive user experience is as follows: After the terminal device scans the two-dimensional code, the installation information of the CPE is directly displayed on the display interface.

Finally, the user who needs to install the CPE may complete the installation of the CPE through the installation information of the CPE displayed on the display interface 1D of the terminal device. For example, if the installation information of the CPE displayed on the display interface 1D includes: An installation location of the CPE is 10 m north, and an installation angle is 45 degrees west of north. According to the indication of the installation information of the CPE, the user may start from the current location of the CPE, move 10 m northward to install the CPE, and make a receiving direction of the CPE face a direction of 45 degrees west of north, to finally complete the installation. For another example, if the installation information of the CPE displayed on the display interface 1D only includes: An installation angle is 45 degrees west of north. In this case, the user can select an installation point outside the window or balcony closest to the current location, or in an indoor or outdoor place without obstruction, and set the receiving direction of the CPE to a direction 45 degrees west of north to complete the installation.

Figure 8:
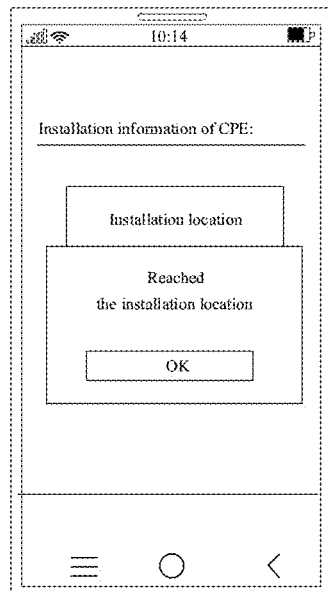
FIG. 8 is a schematic diagram of an embodiment of a display interface of a terminal device according to an embodiment of the application.

In an embodiment, FIG. 8 is a schematic diagram of an embodiment of a display interface of a terminal device according to an embodiment of this application. After the terminal device displays the installation information of the CPE by using the display interface 1D, if the user holds the terminal device and moves the terminal device to the installation location and makes the terminal device face the installation angle, the installation information of the CPE may be displayed in a form such as a dialog box through a display interface 1E shown in FIG. 8. The installation information of the CPE is used to prompt the user that the CPE has moved to the installation location, so that the user can install, according to the prompt on the display interface 1E, the CPE at the current location of the terminal device and in the angle toward which the terminal device faces.

In addition, the installation information may also be presented on a display interface of the terminal device in a graphic manner or the like. For example, a pointer is used to indicate an optimal installation direction at a current location. Alternatively, in a navigation manner, navigation information indicating that the terminal device moves from the current location to a specified location according to a prompted line or pointer direction is prompted, and rotation information indicating that an angle of the terminal device rotates to an installation angle is displayed, so that the user rotates and performs installation according to the prompted direction. The pointer may be indicated in a dynamic manner. For example, when the user holds the terminal device flatly without moving the location and rotates the terminal device, the pointer always points to a fixed geographical location, to indicate an optimal installation direction of the current location.

Figure 9:
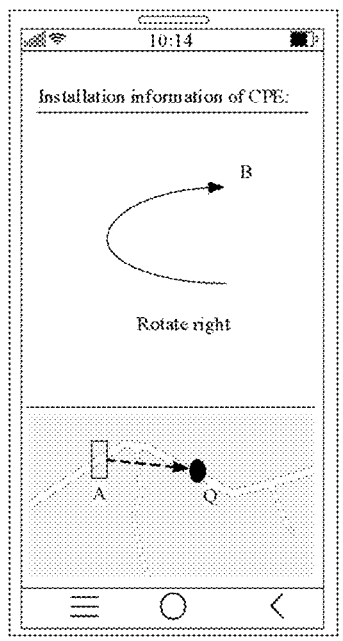
FIG. 9 is a schematic diagram of an embodiment of display interfaces of a terminal device according to an embodiment of the application.
Figure 9:
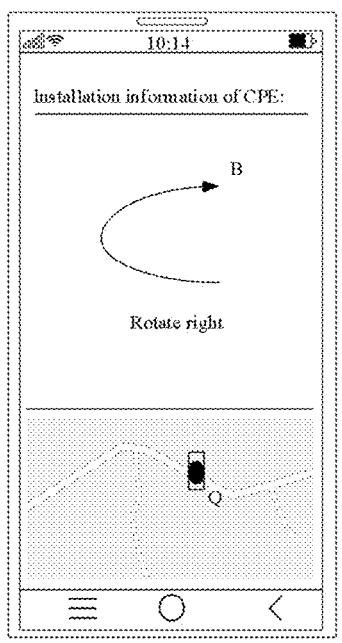
Figure 9:
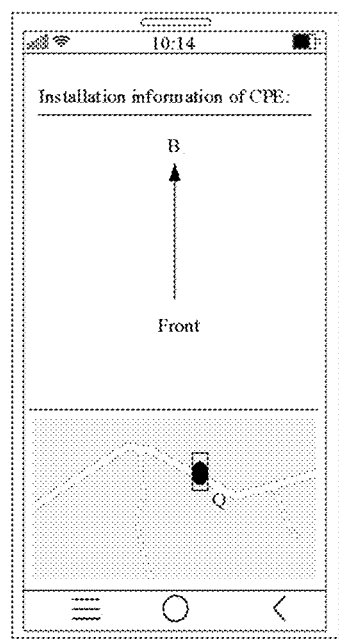

For example, FIG. 9 is a schematic diagram of an embodiment of display interfaces of a terminal device according to an embodiment of this application. After the terminal device determines, in the manner shown in FIG. 4 or FIG. 5, that a point Q near a current location A of the terminal device is an optimal installation point, and is installed toward a location of a base station B, a first icon may be displayed on a display interface 3A and is used to indicate a movement direction from the location A of the terminal device to the installation location Q. For example, the first icon may be the current location A of the terminal device and the optimal installation location Q that are displayed on a map on the display interface 3A, and display a direction of an arrow pointing from the point A to the point Q, to prompt the user to move toward the point Q. In addition, the display interface 3A further displays a second icon used to indicate a rotation direction from the angle toward which the terminal device currently faces to the installation angle. For example, a specified direction (for example, a normal direction when the terminal device is horizontally placed) of the terminal device may be used as a reference direction, and by using an arrow in the upper part of the display interface 3A and an indication of the point B, the user is prompted to rotate to rightward in a normal alignment direction (for example, a direction aligned with a direction of a connection line from a microphone to an earpiece parallel to a screen) when the terminal device is horizontally placed, so that the user can face a direction of the base station B.

Subsequently, when the location of the terminal device changes, for example, when the user moves to the point Q, the terminal device further updates the displayed first icon according to the change of the location. For example, the terminal device displays, on a map in the lower part of a display interface 3B, that the point A coincides with the point Q, and continues to prompt, by using an arrow, the user to rotate rightwards to find the installation angle in which a receiving direction of the CPE is aligned with the base station B. When the angle toward which the terminal device faces changes, for example, after the user aligns the normal direction of the terminal device with the direction of the base station B according to the prompt of the arrow, the terminal device may also update the second icon on the display interface according to the change of the angle. For example, the terminal device displays, on a display interface 3C, an arrow that has been aligned with the direction of the base station B, to prompt the user to install the CPE at a current location point, and uses a direction toward which a normal direction of the current terminal device faces as the receiving direction of the CPE, so that an optimal installation location and an optimal installation angle can be implemented, and the strength of cellular signals that can be received by the CPE can be maximized.

Figure 10:
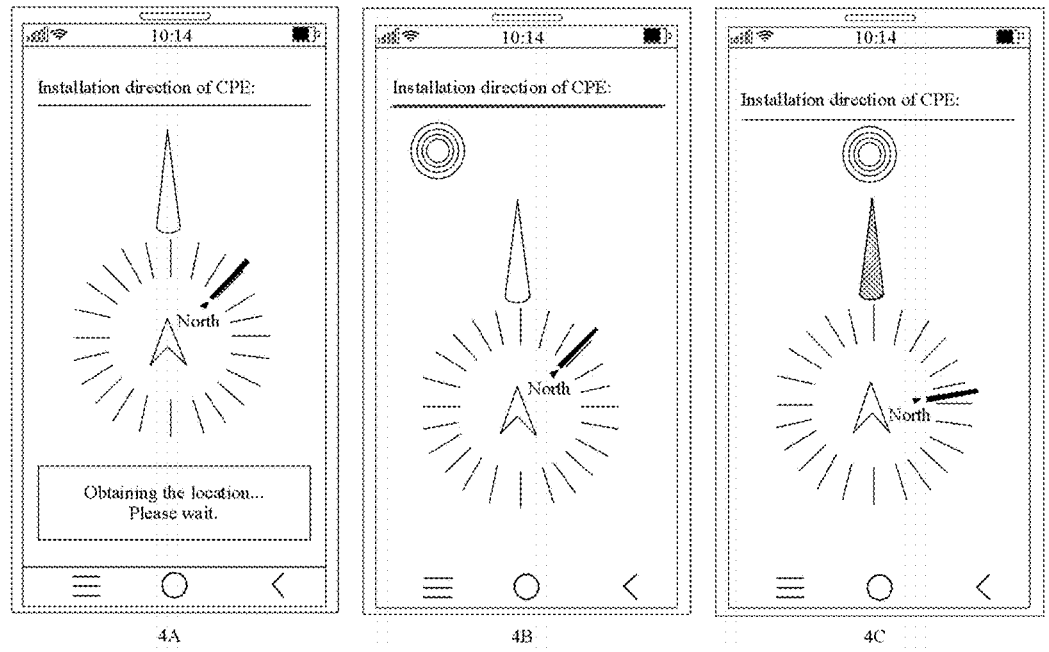
FIG. 10 is a schematic diagram of an embodiment of display interfaces of a terminal device according to an embodiment of the application.

In still another example, FIG. 10 is a schematic diagram of an embodiment of display interfaces of a terminal device according to an embodiment of this application. After the terminal device reaches a recommended installation location based on a map displayed on the display interface shown in FIG. 9, the terminal device obtains, from a display interface 4A shown in FIG. 10, the installation angle of the CPE facing the base station at the current installation location. Alternatively, if the terminal device receives only the installation angle sent by a network device, on a display interface 4A shown in FIG. 10, an image in a form similar to a "compass" is generated based on the installation angle to indicate the installation angle.

On the display page 4B, by using a normal direction of the terminal device perpendicular to the display screen as a reference, a left front location in a current orientation direction (indicated by an upward cone icon in the figure) is indicated as a location of the base station (indicated by a circular icon on the upper left part of the figure) in a form similar to a "compass" based on the current orientation direction of the terminal device and the location of the base station. In this case, the circular icon in the figure may be used to indicate an angle relationship between the base station and the terminal device. Because there is an included angle between the orientation direction of the terminal device and the location of the base station, the user may rotate the terminal device leftward. Alternatively, a circle corresponding to the base station in the figure may be used to indicate a distance from the terminal device. For example, a shorter distance between the terminal device and the base station indicates a shorter distance between the circular icon and the cone icon, and a longer distance between the terminal device and the base station indicates a longer distance between the circular icon and the cone icon. In addition, on the display interface 4B, a line corresponding to "North" may further be used to indicate a north side actually pointed to by a compass.

Subsequently, when the user rotates the terminal device leftward according to an indication in the display interface 4B, and when the terminal device detects that the orientation direction of the terminal device changes, the icon in the display interface 4B is updated again according to the location of the base station and the current orientation direction of the terminal device. For example, when the terminal device rotates leftward, the circle icon corresponding to the base station in the figure moves rightward synchronously.

Finally, when the user rotates the terminal device to make the current orientation direction opposite to the base station, on a display interface 4C, the cone icon corresponding to the current orientation of the terminal device points to a running icon corresponding to the base station in front of the terminal device. In this case, the terminal device may prompt, in a manner of changing the cone icon (deepening the color of the cone icon) or in a manner of popping up a dialog box, prompt information, or the like, the user that the current orientation direction of the terminal device is the recommended installation angle of the CPE. In an embodiment, in the example shown in FIG. 10, when the orientation direction of the terminal device points to the location of the base station, an error of 1° or a smaller angle is allowed.

Figure 11:
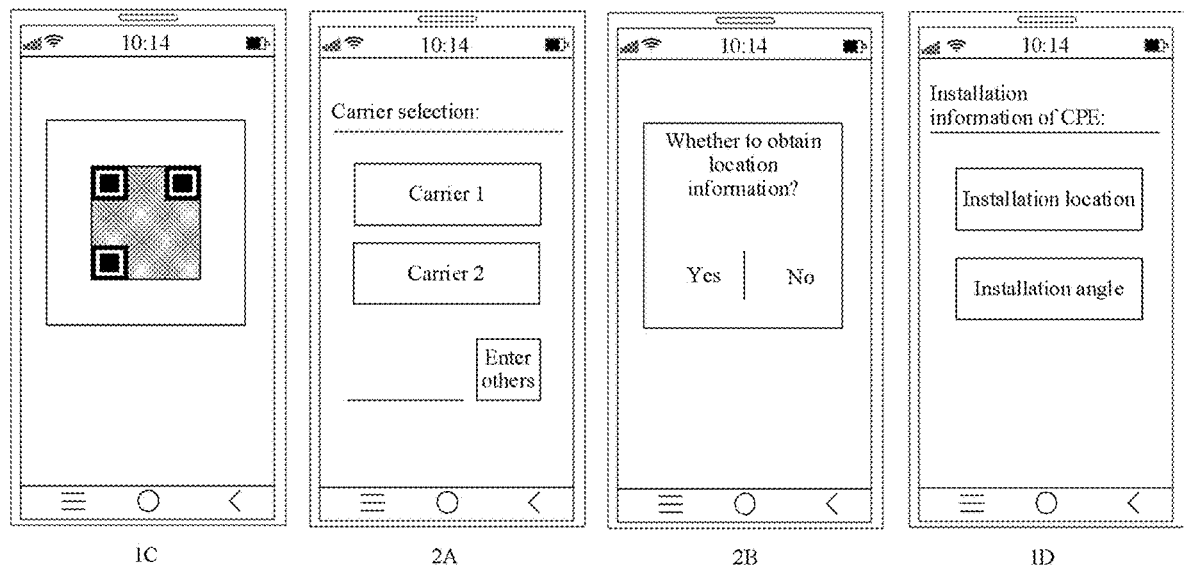
FIG. 11 is a schematic diagram of an embodiment of display interfaces of a terminal device according to an embodiment of the application.

In an embodiment shown in FIG. 6-1A to FIG. 6-1D and FIG. 7-1A' to FIG. 7-1C', the terminal device may obtain the attribute information of the CPE by scanning the graphic identification code. In some application scenarios, a terminal may obtain a part of the attribute information of the CPE by scanning a graphic identification code, and obtain another part of the attribute information of the CPE by receiving the data entered by the user. For example, when the user uses the CPE, the user is located within coverage of base stations provided by different carriers. In this case, a PLMN of a carrier selected by the user may be used as the PLMN in the CPE attribute information. For example, FIG. 11 is a schematic diagram of an embodiment of display interfaces of a terminal device according to an embodiment of this application, and the terminal device shown in FIG. 11 can obtain attribute information such as a RAT type and a CPE key competency of the CPE by scanning a two-dimensional code of CPE through a display interface 1C. Subsequently, to obtain a PLMN selected by a user, the terminal device may display a selection box in a display interface 2A, so that the user selects a PLMN used by the CPE, namely, a carrier. For example, selection boxes of common "Carrier 1" and "Carrier 2", and an input box of another carrier may be displayed in the display interface 2A, so that the user can perform selection or input. Finally, the terminal device may determine the PLMN of the CPE based on a tapping operation of the user on a selection box in the display interface 2A. In an embodiment, "Carrier 1" and "Carrier 2" displayed on the display interface 2A may alternatively be determined by the terminal device based on coverage of a base station at a current location, that is, the terminal device detects that the current location is within coverage of a base station of the carrier 1 and a base station of the carrier 2. In this case, selection boxes of "Carrier 1" and "Carrier 2" are displayed on the display interface 2A. The PLMN may alternatively be obtained by the user to enter a part or all of a mobile directory number (MDN) corresponding to a SIM card. For example, when the user enters 138 on the display interface, the terminal device may determine, by accessing the Internet or by using a local database, that a PLMN corresponding to the SIM card is the carrier 1.

In an embodiment, in the example shown in FIG. 11, it is further shown that the terminal device determines latitude and longitude data of the current location as the location information by invoking a positioning apparatus such as a GPS receiving module. In this case, from a perspective of security, the terminal device may determine, for the user in a manner of popping up a selection box in a display interface 2B, whether obtaining of the location information of the terminal device is allowed, and the terminal device can invoke the positioning apparatus to determine the latitude and longitude data of the current location only after the user taps "Yes".

Finally, in the example shown in FIG. 11, after the user uses the terminal device to scan the two-dimensional code of the CPE through the display interface 1C, the user further needs to perform an operation on the display interface 2A and/or the display interface 2B to view the displayed installation information of the CPE on a display interface 1D of the terminal device. In conclusion, in this embodiment, on the basis that the terminal device scans the two-dimensional code of the CPE to obtain a part of the attribute information of the CPE, after the user performs a simple tap-and-select operation on the part of the information, the attribute information of the CPE and the location information of the terminal device can be obtained, and the attribute information and the location information is carried in the request for obtaining the installation information of the CPE sent to the first server. Finally, the installation information of the CPE is obtained through the installation information of the CPE sent by the first server. Therefore, in this embodiment, the user can complete installation of the entire CPE by using the terminal device, thereby saving time costs and labor costs consumed when the user installs the CPE before using the CPE, and improving user experience when the user using the CPE installs the CPE. In addition, the user may select some attribute information of the CPE based on a requirement of the user, so that the first server can determine the installation information of the CPE based on the selection of the user, thereby improving accuracy of the determined installation information of the CPE and flexibility of specifying by the user.

Figure 12:
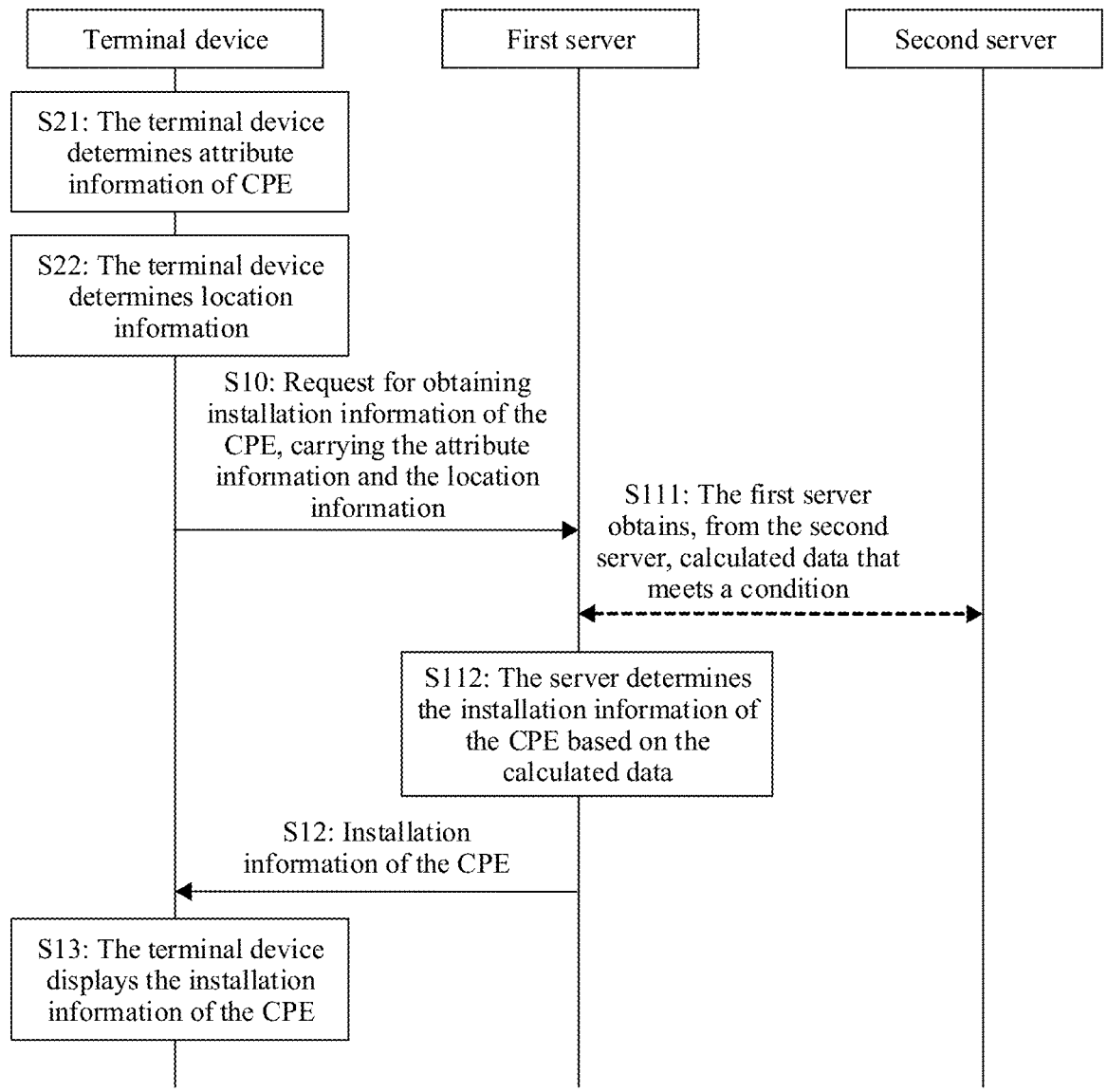
FIG. 12 is a schematic flowchart of an embodiment of a method for obtaining installation information of CPE according to this application.

Further, for the first server provided in the embodiments in FIG. 4 and FIG. 5 of this application, after receiving the request for obtaining the installation information of the CPE sent by the terminal device, the first server may determine, based on signal fingerprint information or base station location information, the installation information of the CPE requested by the terminal device. The following describes two manners of determining the installation information of the CPE by the first server with reference to the accompanying drawings. FIG. 12 is a schematic flowchart of an embodiment of a method for obtaining installation information of CPE according to an embodiment of the application.

For example, in a first possible implementation shown in FIG. 12, after the first server receives the request for obtaining the installation information of the CPE sent by the terminal device in S10, the first server obtains, from a second server, calculated data that meets a condition in S111. The calculated data includes a reference signal receiving power (RSRP) and corresponding location information that are reported by another terminal device within a preset range (for example, within a circular area that uses the terminal device as a center and whose radius is 1 km) of location information requested by the terminal device. The second server may be a specially disposed server configured to store related data, and may be denoted as a fourth device, and the first server may communicate with the second server; or the second server may be a module in the first server. The second server stores RSRPs reported by different terminal devices at a same location or different locations. When obtaining user authorization, all terminal devices that can communicate with the second server may report, to the second server, locations of the terminal devices and RSRPs of serving cells, camping cells, or neighboring cells that are obtained through measurement at the locations. In this case, the second server may collect RSRPs of serving cells, camping cells, or neighboring cells that are measured by different terminal devices at a same location or different locations. For example, a format of data that may be stored in the second server is shown in Table 2. The second server stores RSRPs of a cell measured by different terminal devices at N locations, and each location is represented by longitude and latitude data of the location. The signal fingerprint information is magnitudes of signal strengths (which may be measured by RSPRs) of a signal sent by a base station at different locations, namely, information about the signal sent by the base station. In addition, because signal strengths at different locations may be different, in some technologies, "fingerprint" information may be used to refer to strengths of a signal of a base station at different locations. For example, in this embodiment of this application, a piece of "RSRP-location" data that corresponds to a specified cell and that is stored in the second server may be denoted as a piece of signal fingerprint information.

TABLE 2

| RSRP 1 | Longitude and latitude 1 |
| RSRP 2 | Longitude and latitude 2 |
| . . . | . . . |
| RSRP N | Longitude and latitude N |

Figure 13:
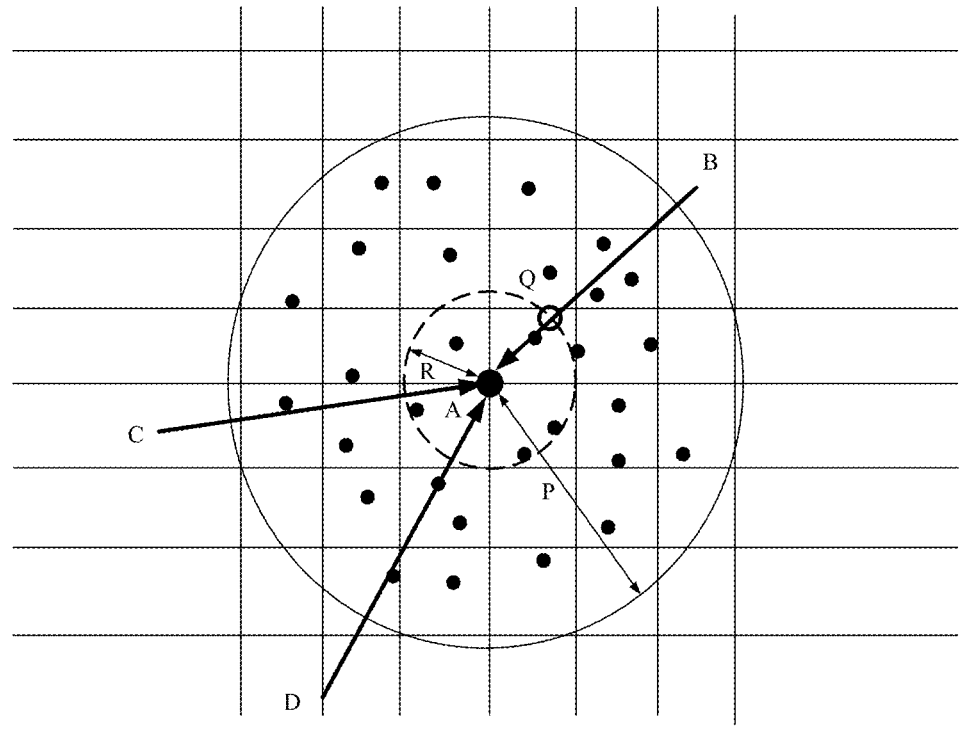
FIG. 13 is a schematic diagram of determining installation information of CPE according to an embodiment of the application.

Therefore, after receiving the request for obtaining the installation information of the CPE sent by the terminal device, the first server may obtain, from the second server, signal fingerprint information of one or more cells that meet a condition. The condition may be filtered based on the attribute information of the CPE and the location information of the terminal device in the request for obtaining the installation information of the CPE that is received by the first server. For example, FIG. 13 is a schematic diagram of determining installation information of CPE according to an embodiment of the application, and when the location information carried in the request for obtaining the installation information of the CPE that is received by the first server is longitude and latitude data of a point A, and the attribute information of the CPE is a carrier 1, the first server obtains, from the second server, signal fingerprint information of all cells operated by the carrier 1 in a preset range of a circular area that uses the point A as a center of the circle and whose radius is P, to obtain all dots shown in FIG. 13. Each dot represents a signal fingerprint at the location. Each signal fingerprint includes at least location information and an RSRP value measured at the location, and may be used to indicate signal strength information at the location. The radius P may be a specified value. Alternatively, the radius P may be entered by the user of the terminal device, carried in the request for obtaining the installation information of the CPE, and sent to the first server.

After obtaining, from the second server, all signal fingerprint information in the circular area whose radius is P shown in FIG. 13, the first server may estimate a direction of arrival at a location A by using RSRPs at different locations, to speculate a location and a direction of the base station of the carrier 1 from the point A. In a statistical sense, a location closer to the base station may indicate a larger RSRP value, and a location farther from the base station may indicate a smaller RSRP value. Based on this, for example, the first server may determine that RSRPs has a change rule from far to near: "−80 dBm", "−95 dBm", and "−98 dBm" in a B-A direction, and the change rule is similar to a free space loss model of signals transmitted by the base station. In this case, it may be considered that the B-A direction is a direction of arrival close to a direct-view path, that is, there is a base station disposed by a carrier 1 at a location of the point A toward a point B, and a signal transmitted by a cell carried by the base station may be propagated to the point A through the point B. According to a same principle, the first server may determine that the B-A direction, a C-A direction, and a D-A direction in FIG. 13 are all directions of arrival. Subsequently, the first server may further determine, based on the determined one or more directions of arrival, that in cellular signals that are from one or more base stations and that are received by the terminal device at a point Q in a to-be-installed area of the CPE (for example, in a specified circular area in which the user expects to install the CPE, whose center is the point A, and whose radius is R, where this area is denoted as a specified range and may be a building in which the user is located, and before the first server determines the installation information of the CPE, the specified range may be sent by the user to the first server by using the terminal device), a cellular signal from the base station in the B-A direction has a largest RSRP value. Therefore, it can be determined that the installation location of the CPE is the point Q, and an installation angle of the CPE at the point Q toward the point B is used as the installation angle of the CPE. In an embodiment, the radius R may be a specified value, for example, 10 meters. Alternatively, the radius R may be entered by the user of the terminal device, carried in the request for obtaining the installation information of the CPE, and sent to the first server. In an embodiment, the radius P is greater than or equal to the radius R.

In an embodiment, to more accurately calculate the installation angle in the installation information of the CPE, when the direction of arrival shown in FIG. 13 is calculated, a normal direction or a tangent direction of the terminal device may be used as a reference direction of each direction of arrival. Subsequently, after receiving the installation information of the CPE sent by the first server, the terminal device may determine a relative relationship between the installation angle of the CPE and the terminal device based on the reference direction of the terminal device.

In a second possible implementation, after the first server receives the request for obtaining the installation information of the CPE sent by the terminal device in S10, the first server obtains, from a second server, calculated data that meets a condition in S111. The calculated data includes location information of a base station to which all cells that meet the condition within coverage of location information requested by the terminal device belong. Similarly, the second server may be a specially disposed server configured to store related data, and the first server may communicate with the second server; or the second server may be a module in the first server. The second server stores locations of base stations deployed by different carriers, and a location of each base station may be represented by longitude and latitude data of the location.

In an embodiment, the second possible implementation may be implemented independently. Alternatively, in the first possible implementation, if the second server does not store the signal fingerprint information, or if the first server does not obtain, from the second server, the signal fingerprint information corresponding to the location information and the attribute information requested by the terminal device, the first server may further obtain the location of the base station in the second possible implementation.

Figure 14:
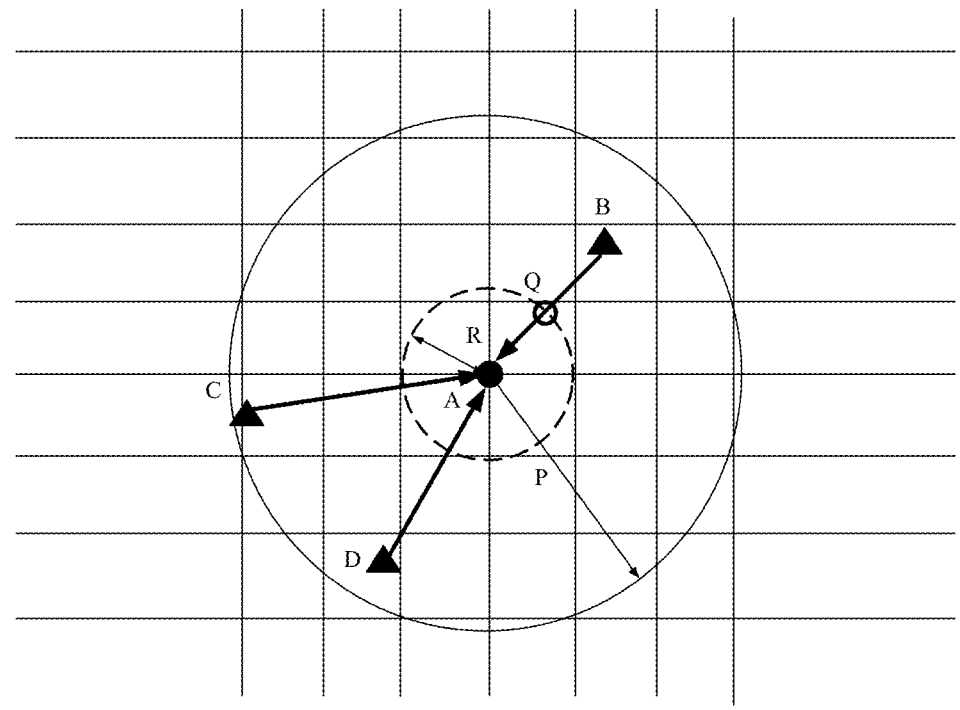
FIG. 14 is another schematic diagram of determining installation information of CPE according to an embodiment of the application.

Therefore, after receiving the request for obtaining the installation information of the CPE sent by the terminal device, the first server may obtain, from the second server, the location information of the base station that meets the condition. The condition may be filtered based on the attribute information of the CPE and the location information of the terminal device in the request for obtaining the installation information of the CPE that is received by the first server. For example, FIG. 14 is another schematic diagram of determining installation information of CPE according to an embodiment of the application, and when the location information carried in the request for obtaining the installation information of the CPE received by the first server is longitude and latitude data of a point A, the attribute information of the CPE is a carrier 1, a supported RAT type is 5G NR, a working frequency of the CPE is specified, and the like, the first server obtains, from the second server, a location of a base station that meets the following conditions: (1) A location of a signal source of a base station or a cell is within a preset range whose center is a location of the point A of the terminal device and whose radius is P. (2) A RAT type supported by a base station or a cell matches the attribute information of the CPE. (3) Parameters such as a working frequency of a base station meet parameters specified by the CPE. Finally, location information of all base stations B, C, and D that can provide cellular signals for the CPE and that are within a circular area whose center is the point A and whose radius is P shown in FIG. 10 is obtained.

After obtaining, from the second server, the locations of all the base stations in the circular area with the radius of P shown in FIG. 14, the first server may determine the installation information of the CPE based on a location A and the locations of the base stations. A strength of a cellular signal received at a location at which the CPE is closer to the base station may be larger, and a strength of a cellular signal received at a location at which the CPE is farther from the base station may be smaller. For example, the first server may determine that the base station B is closest to the location A. Subsequently, the first server may further determine, based on the determined closest base station B, that a signal strength of a cellular signal received by the terminal device from the base station B is the largest at the point Q in the to-be-installed area of the CPE (for example, in a circular area whose center is the point A, whose radius is R, and that is specified by the user as expected to install the CPE). Therefore, it can be determined that the installation location of the CPE is the point Q, and an installation angle of the CPE at the point Q toward the base station B is used as the installation angle of the CPE. In an embodiment, the radius R may be a specified value, for example, 10 meters. Alternatively, the radius R may be entered by the user of the terminal device, carried in the request for obtaining the installation information of the CPE, and sent to the first server. In an embodiment, the radius P is greater than or equal to the radius R.

Figure 15:
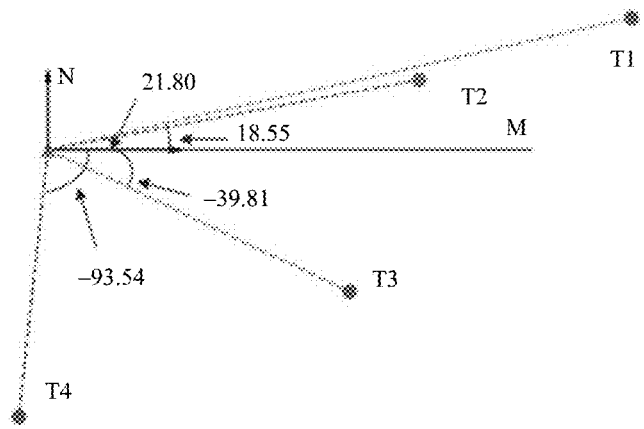
FIG. 15 is a schematic diagram of a base station location determined by a terminal device according to an embodiment of the application.

For example, FIG. 15 is a schematic diagram of a base station location determined by a terminal device according to an embodiment of the application. An included angle between a direction M toward which the terminal device currently faces and a direction of arrival of each base station location may be obtained by using a normal N perpendicular to a display screen of the terminal device as a reference and based on a location (a triangle identifier in the figure) of the terminal device. For example, an included angle between a direction of arrival of a base station T1 and the direction M toward which the terminal device currently faces is 21.8°; an included angle between a direction of arrival of a base station T2 and the direction M toward which the terminal device currently faces is 18.55°; an included angle between a direction of arrival of a base station T3 and the direction M toward which the terminal device currently faces is −39.81°; and an included angle between a direction of arrival of a base station T4 and the direction M toward which the terminal device currently faces is −93.54°.

Figure 16:
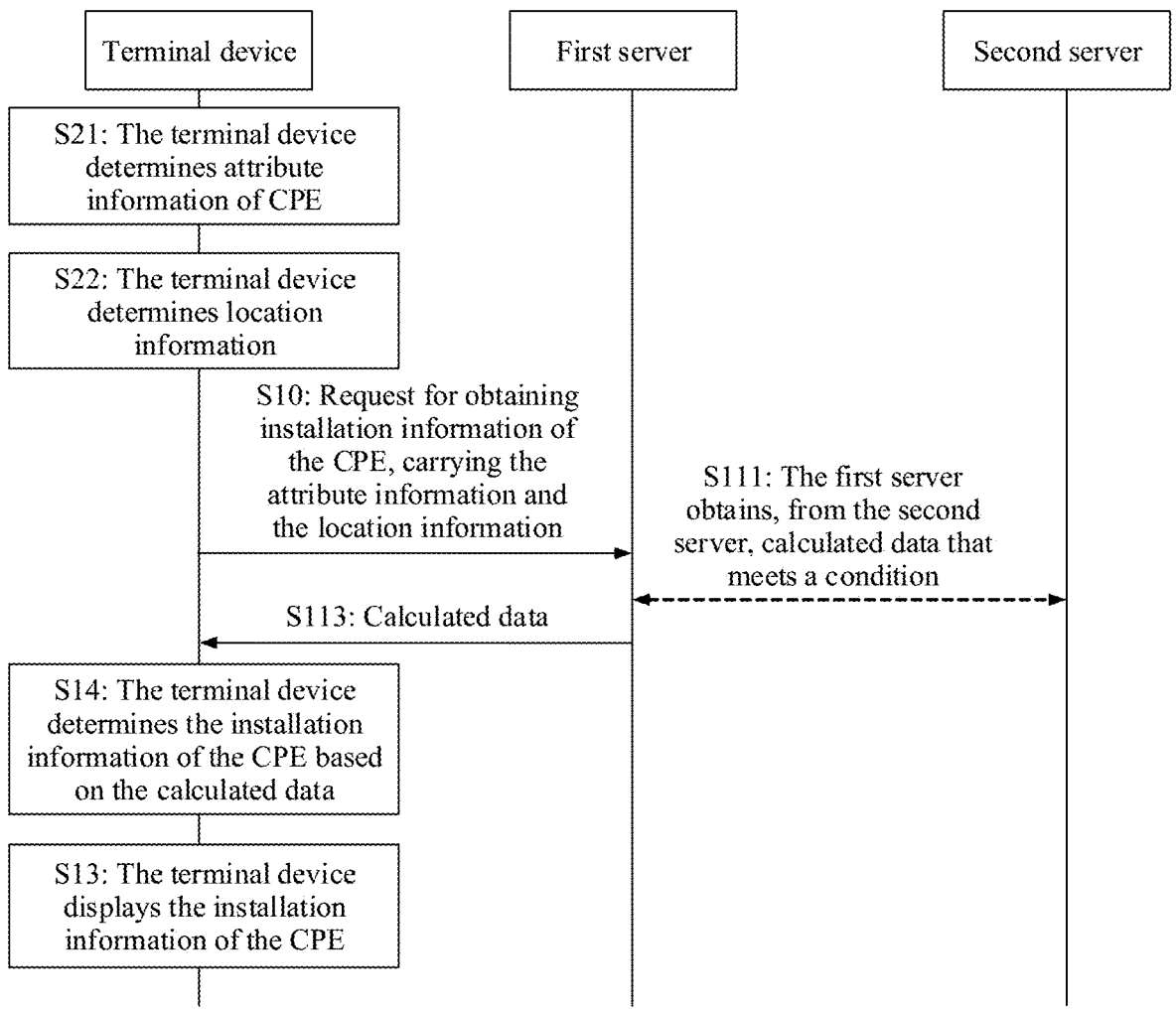
FIG. 16 is a schematic flowchart of an embodiment of a method for obtaining installation information of CPE according to an embodiment of the application.

In an embodiment shown in FIG. 12, after receiving the request for obtaining the installation information of the CPE sent by the terminal device, the first server obtains, from the second server, the calculated data that meets a condition, and then the first server obtains the installation information of the CPE based on the calculated data, and sends the obtained installation information of the CPE to the terminal device, so that the terminal device can directly display the installation information of the CPE after receiving the installation information of the CPE. In another possible implementation, FIG. 16 is a schematic flowchart of an embodiment of a method for obtaining installation information of CPE according to an embodiment of the application. In the embodiment shown in FIG. 16, after receiving the request for obtaining the installation information of the CPE sent by the terminal device through S10, the first server obtains, from the second server through S111, the calculated data that meets the condition. However, the first server does not determine the installation information of the CPE, but directly sends the obtained calculation data to the terminal device through S113. The terminal device determines the installation information of the CPE based on the received calculation data through S14, and finally directly displays the calculated installation information of the CPE through S13. For the method for determining the installation information of the CPE by the terminal device in S14, refer to the method for determining the installation information of the CPE by the first server in the embodiment shown in FIG. 13 or FIG. 14. The implementations and principles are the same, and the difference lies in that the calculation is performed by the terminal device, which is not described again.

Therefore, in this embodiment, the user may also use the terminal device to obtain the installation information of the CPE and complete the installation of the entire CPE, so that the user does not need to hire a professional operator to complete the installation of the CPE. This saves time costs and labor costs consumed when the user installs the CPE before using the CPE, and improves user experience when the user using the CPE installs the CPE.

Figure 17:
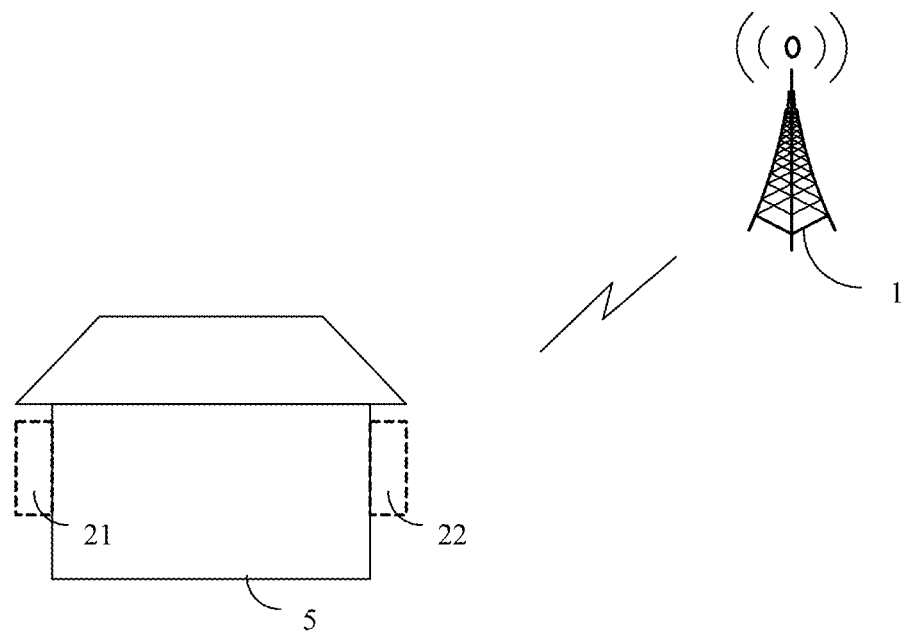
FIG. 17 is a schematic diagram of a set location of CPE.

Further, in the foregoing embodiments, the installation location in the installation information of the CPE determined by the first server may be understood as an absolute location relative to map data, that is, a location is provided for the user to directly install the CPE. However, in some scenarios, the determined location closest to the base station may be blocked by a building, so that a strength of a cellular signal received by the CPE from the base station at the blocked location is affected. For example, FIG. 17 is a schematic diagram of a set location of CPE. In FIG. 17, it is assumed that a user needs to install the CPE outside a building 5, and a base station 1 whose cellular signal can be received by the CPE is located on the right side of the figure. When the user installs the CPE at a location 21 on the left side of the figure, the cellular signal received by the CPE is blocked by the building 5, resulting in poor communication quality of the CPE. When the user installs the CPE at a location 22 on the right side of the figure and sets a receiving direction of the CPE toward the base station 1, a cellular signal with a maximum signal strength from the base station 1 can be received. Therefore, this application further provides a method for determining location information in installation information of the CPE, so that a terminal device can receive a relative installation location of a CPE installation location relative to a target object (for example, a building), and the CPE is not blocked by the building when receiving a cellular signal.

Figure 18:
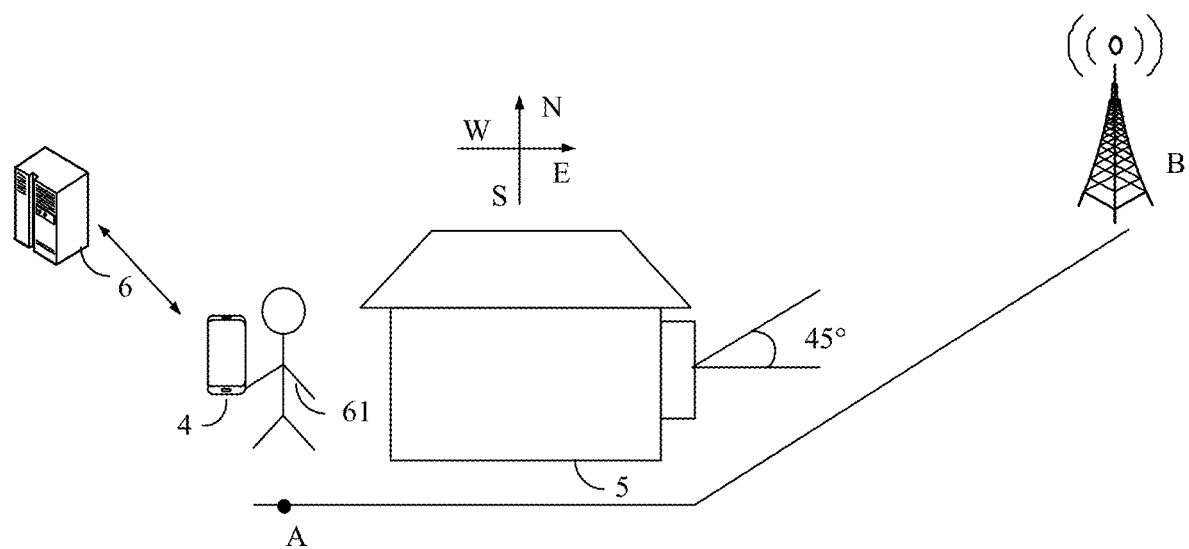
FIG. 18 is a schematic application diagram of an embodiment of a method for obtaining installation information of CPE according to an embodiment of the application.
Figure 19:
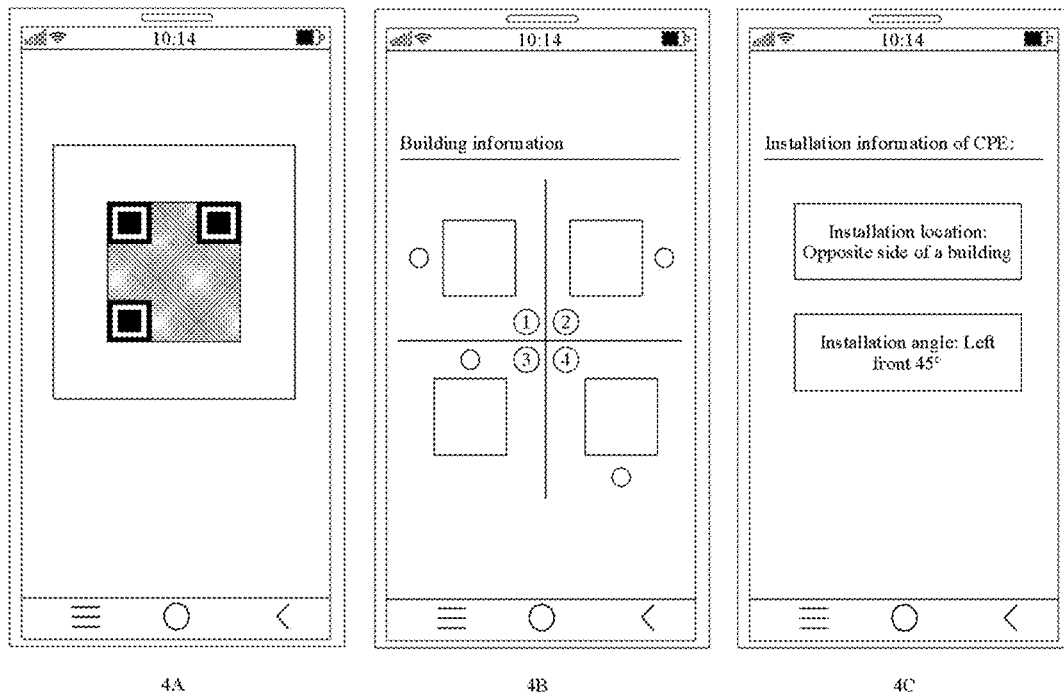
FIG. 19 is a schematic diagram of an embodiment of display interfaces of a terminal device according to an embodiment of the application.

For example, FIG. 18 is a schematic application diagram of an embodiment of a method for obtaining installation information of CPE according to an embodiment of the application, and when a user 61 expects to install CPE outside a building 5, the user may use a portable terminal device 4 to input information indicating a relative location between a current location and a building. For example, FIG. 19 is a schematic diagram of an embodiment of display interfaces of a terminal device according to an embodiment of this application. After a user uses the terminal device to scan a two-dimensional code of CPE through a display interface 4A, the terminal device displays four selections of orientation information in a display interface 4B, for example, option ① indicates that the user (represented by a smaller circle) is located on the west side of the building (represented by a positive direction), option ② indicates that the user is located on the east side of the building, option ③ indicates that the user is located on the north side of the building, and option indicates that the user is located on the south side of the building. In this case, the user 61 in FIG. 18 may tap option ① in the display interface 4B of the terminal device 4 based on a current location of the user 61 on the west side of the building 5. Subsequently, the terminal device sends a request for obtaining installation information of CPE to the first server. The request carries building information of option ①.

Correspondingly, after receiving the request for obtaining the installation information of the CPE, the first server may determine, according to the method shown in FIG. 13 or FIG. 14, that an optimal installation point of the CPE is located at the point Q near the location A of the user and faces a direction of the base station B. However, in this case, it needs to be considered that the user performs installation outside the building 5. Therefore, in the example shown in FIG. 18, when the user 61 is located on the west side of the building 5, but the determined optimal installation point Q is located in an east side direction of the building, to improve a strength of a signal received by the CPE from the base station B as much as possible, the building may refer to the point Q, so that when the CPE is installed in the east side direction of the building 5, the CPE may be closer to the determined point Q in the east side direction of the building. Therefore, the installation location in the installation information of the CPE on a surface of the building on the east side may be obtained. That is, the location information in the installation information of the CPE determined by the first server is the east side of the building 5, and the angle information is 45 degrees east by north. Subsequently, the first server sends the installation information of the CPE to the terminal device. The installation information of the CPE includes the determined installation information of the CPE.

Finally, after receiving the installation information of the CPE, the terminal device may display the installation information of the CPE in the installation information of the CPE in a form of text on a display interface 4C. For example, because a current user is located on the west side of the building, but the determined installation location of the CPE is on the east side of the building, the installation location is displayed to the user in a more direct manner "Installation location: Opposite side of a building". In addition, after the user installs the CPE on the east side of the building, a receiving direction of the CPE further needs to be set to a location of the base station B 45 degrees east by north. In this case, prompt information displayed by the terminal device may be "Installation angle: Left front 45°" more direct for the user. In an embodiment, after receiving the installation information of the CPE, the terminal device may display the installation information of the CPE in a graphic form in the display interface 4C.

Figure 20:
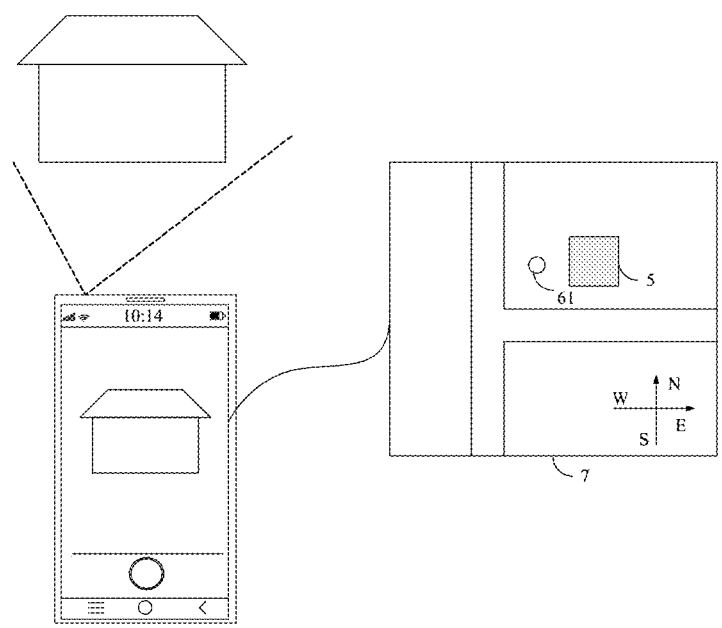
FIG. 20 is a schematic application diagram of an embodiment of a method for obtaining installation information of CPE according to an embodiment of the application.

In an embodiment, the terminal device displays options indicating a relationship with the building to the user, and determines, based on a selection made by the user, that a current location of the user is located on a side of the building. In another possible implementation, for example, FIG. 20 is a schematic application diagram of an embodiment of a method for obtaining installation information of CPE according to an embodiment of the application. In the example shown in FIG. 20, to obtain information for indicating a current location relationship with a building, after the user uses the terminal device to scan the two-dimensional code of the CPE, the user further needs to take a photo of the building 5 by using the terminal device, and carry the taken photo in the request for obtaining the installation information of the CPE sent to the first server. In this way, the first server jointly determines, based on the photo taken by the user and the current location and with reference to map data 7 in FIG. 20, that the location of the user 61 is on the west side of the building 5.

In conclusion, in the method for obtaining installation information according to an embodiment of the embodiment, after the user scans the two-dimensional code of the CPE by using the terminal device such as a mobile phone carried with the user and determines the current relationship with the building, the installation information such as the installation location and the installation angle of the CPE may be determined according to the indication of the installation information of the CPE displayed on the display interface of the terminal device. When the CPE is installed outside the building, the strength of a cellular signal received by the CPE is the largest, and the CPE is not blocked by the building when receiving the cellular signal, to ensure communication quality of the CPE as much as possible. In addition, in an installation process, no professional operator is hired to complete installation of the CPE. This saves time costs and labor costs consumed when the user installs the CPE before using the CPE, and improves user experience when the user using the CPE installs the CPE.

Figure 21:
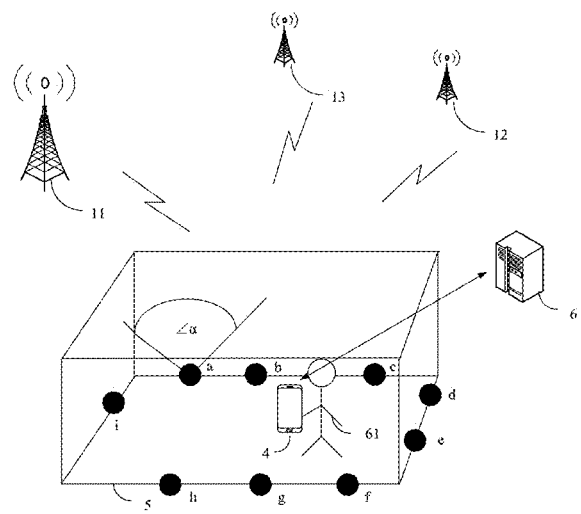
FIG. 21 is a schematic application diagram of an embodiment of a method for obtaining installation information of CPE according to an embodiment of the application.

In an embodiment of the application, the first server can determine the installation information of the CPE based on the signal fingerprint data or the location of the base station. However, when the first server cannot obtain the foregoing information, and cannot determine the installation information of the CPE, this application further provides a method for determining installation information of CPE through measurement of a terminal device. For example, FIG. 21 is a schematic application diagram of an embodiment of a method for obtaining installation information of CPE according to an embodiment of the application. In the example shown in FIG. 21, it is assumed that the user plans to install the CPE within a range of the building 5. In this case, the user 61 may detect, by using the terminal device 4, a strength of a cellular signal received from the base station at each location at which the CPE can be installed in the building, and determine an optimal installation location of the CPE as the installation information of the CPE based on a detection result of each location. In this case, the terminal device used by the user needs to be in a same standard as the CPE. For example, the terminal device and the CPE may receive a cellular signal sent by a base station of a same carrier, the terminal device needs to support a 5G standard in which the CPE works, and the like.

Figures 5A, 5B, 22:
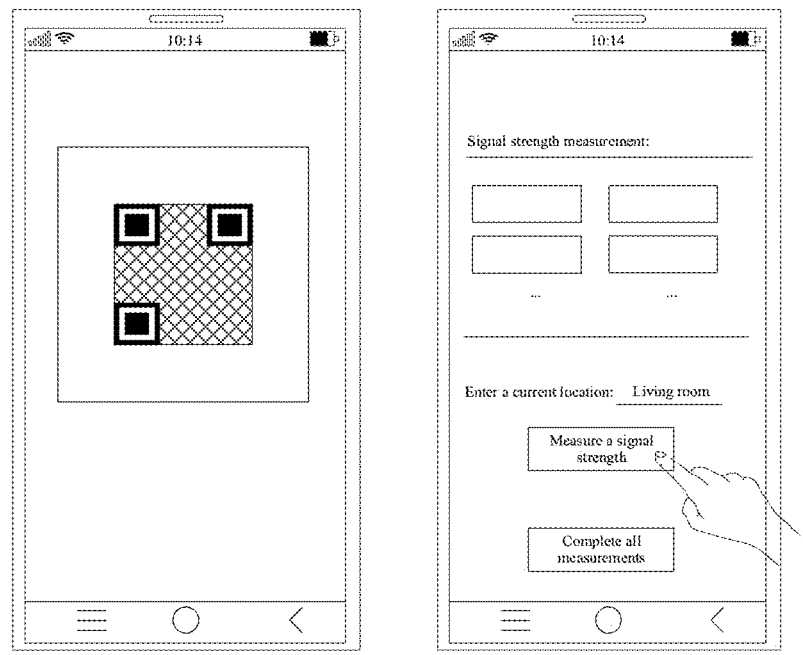
FIG. 22-5A to FIG. 22-5D are schematic diagrams of an embodiment of display interfaces of a terminal device according to an embodiment of the application.
Figures 5C, 5D, 22:
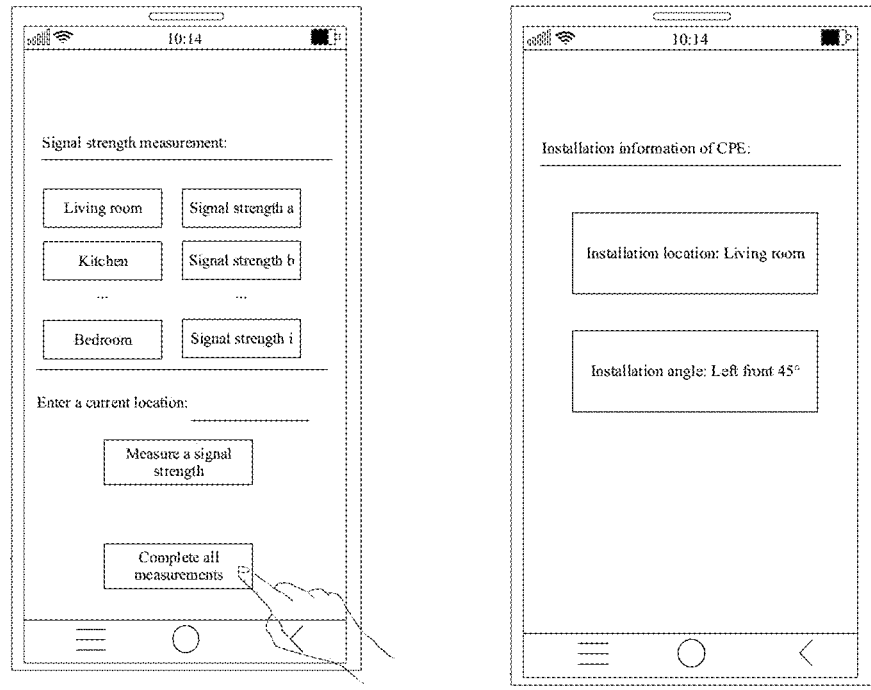

For example, FIG. 22-5A to FIG. 22-5D are a schematic diagram of an embodiment of display interfaces of a terminal device according to an embodiment of this application. In a display interface 5A shown in FIG. 22-5A to FIG. 22-5D, a user may scan a two-dimensional code of to-be-installed CPE by using the terminal device, to obtain attribute information of the CPE. Subsequently, the user may hold the terminal device to sequentially perform measurement at each location of a location a to a location i in FIG. 21. In this case, the terminal device may display an input box by using a display interface 5B, so that the user enters information about the current location for marking. For example, when the user holds the terminal device at a window of the location a of the building 5, the user may enter the location a as "Living room", and tap a button "Measure signal strength" in the display interface 5B. Then, the terminal device may measure a strength of a cellular signal received at the location a, and record the strength. In an embodiment, after the user taps a control of "Measure signal strength" at the location a, the user may rotate the terminal device within a range of $\angle\alpha=180°$ shown in FIG. 22-5A to FIG. 22-5D, so that the terminal device measures a received signal strength of a cellular signal that is of a base station or a cell at the current measurement location a and that is received in at least one preset direction within a range of 180 degrees by using the location a as a center of a circle. After the user marks and detects each location from the location a to the location i in FIG. 21, the terminal device displays measurement data of all locations on the display interface 5C, and the user may tap a control of "complete all measurement" on a display interface 5C. Then, the terminal device may determine that location information of a target location and angle information of the target location toward a target direction are the installation information of the CPE. When the target location is set in the target direction, the received signal strength of the cellular signal of the base station or cell that is received by the CPE is the largest, for example, when it is determined that in FIG. 21, the target location is the location a, and the target direction is that the receiving direction faces 45 degrees left front, the received signal strength of the cellular signal received by the CPE from the base station 11 is the largest. Finally, the terminal device may display the determined installation information of the CPE by using a display interface 5D, for example, a mark "Living room" made by the user on the location a may be displayed, and an installation angle "Left front 45°" is displayed.

In an embodiment, in the foregoing method, first, a user uses a terminal device to scan a graphic identification code (for example, a two-dimensional code) of the CPE to obtain attribute information of the CPE; then, the terminal device obtains, through user input or graphic scanning, a PLMN supported by a SIM card of the CPE; and an application (for example, Smart Life) of the terminal device determines whether the terminal device and the CPE support a same standard, where the standard includes information such as a supported RAT type, a frequency band, and a PLMN. If the terminal device and the CPE support the same standard, the installation information of the CPE is obtained through measurement of the terminal device in FIG. 21 and FIG. 22-5A to FIG. 22-5D.

Further, in the embodiments shown in FIG. 21 and FIG. 22-5A to FIG. 22-5D, in a case in which the terminal device and the CPE are in a same standard, the user may directly use the terminal device to replace the CPE to complete cellular signal strength measurement. However, when the user uses the terminal device to scan the graphic identification code (for example, the two-dimensional code) of the CPE to obtain the attribute information of the CPE, the terminal device obtains, through user input or graphic scanning, the PLMN supported by the SIM card of the CPE. The application (for example, Smart Life) of the terminal device determines whether the terminal device and the CPE support the same standard, the standard includes the information such as the supported RAT type, the frequency band, and the PLMN. If the standard of the terminal device is different from that of the CPE, this application further provides another method for measuring a cellular signal strength by connecting the terminal device to the CPE and finally determining the installation information of the CPE.

Figure 23:
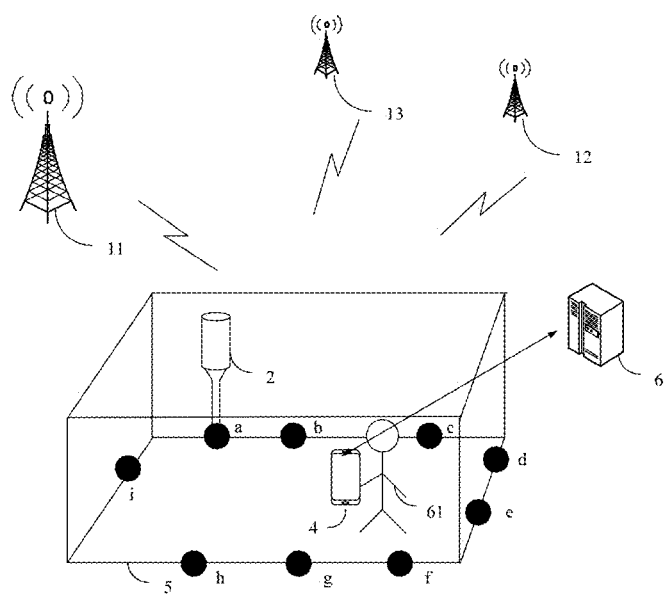
FIG. 23 is a schematic application diagram of an embodiment of a method for obtaining installation information of CPE according to an embodiment of the application.

For example, FIG. 23 is a schematic application diagram of an embodiment of a method for obtaining installation information of CPE according to an embodiment of the application. In an example shown in FIG. 23, it is assumed that a user plans to install CPE within a range of a building 5, but a terminal device and the CPE are of different standards. Therefore, the user may set the CPE 2 at each location from the location a to the location i in FIG. 23 to perform measurement, and record a measurement result by using the terminal device connected to the CPE.

During measurement, the terminal device may also record the measurement result by using the display interfaces shown in FIG. 22-5A to FIG. 22-5D. For example, after the user may set the CPE 2 at the window of the location a of the building 5, the user may enter the location a as "Living room" on the display interface 5B, tap the button "Measure signal strength" in the display interface 5B, and then the terminal device may measure and record a strength of a cellular signal received by the CPE at the location a. In an embodiment, after the user taps the control of "Measure signal strength" at the location a, the CPE may be rotated within a range of ∠α=180° shown in FIG. 22-5A to FIG. 22-5D, so that the terminal device obtains a signal strength of the CPE within the range of 180 degrees by using the location a as a center of a circle, and the signal strength is denoted as a signal strength a. After the user sets the CPE at each location from the location a to the location i in FIG. 23 and performs marking and detection, the terminal device displays measurement data of all locations in the display interface 5C, and the user may tap a control of "Complete all measurements" in the display interface 5C. Subsequently, the terminal device may determine, based on the signal strength received by the CPE and measured at each location, that, for example, at the location a in FIG. 23, when the receiving direction faces 45 degrees left front, the strength of the cellular signal received by the CPE from the base station is the largest. Finally, the terminal device may display the determined installation information of the CPE by using the display interface 5D, for example, may display "Living room" marked by the user on the location a, and display an installation angle as "45° left front".

Figure 24B:
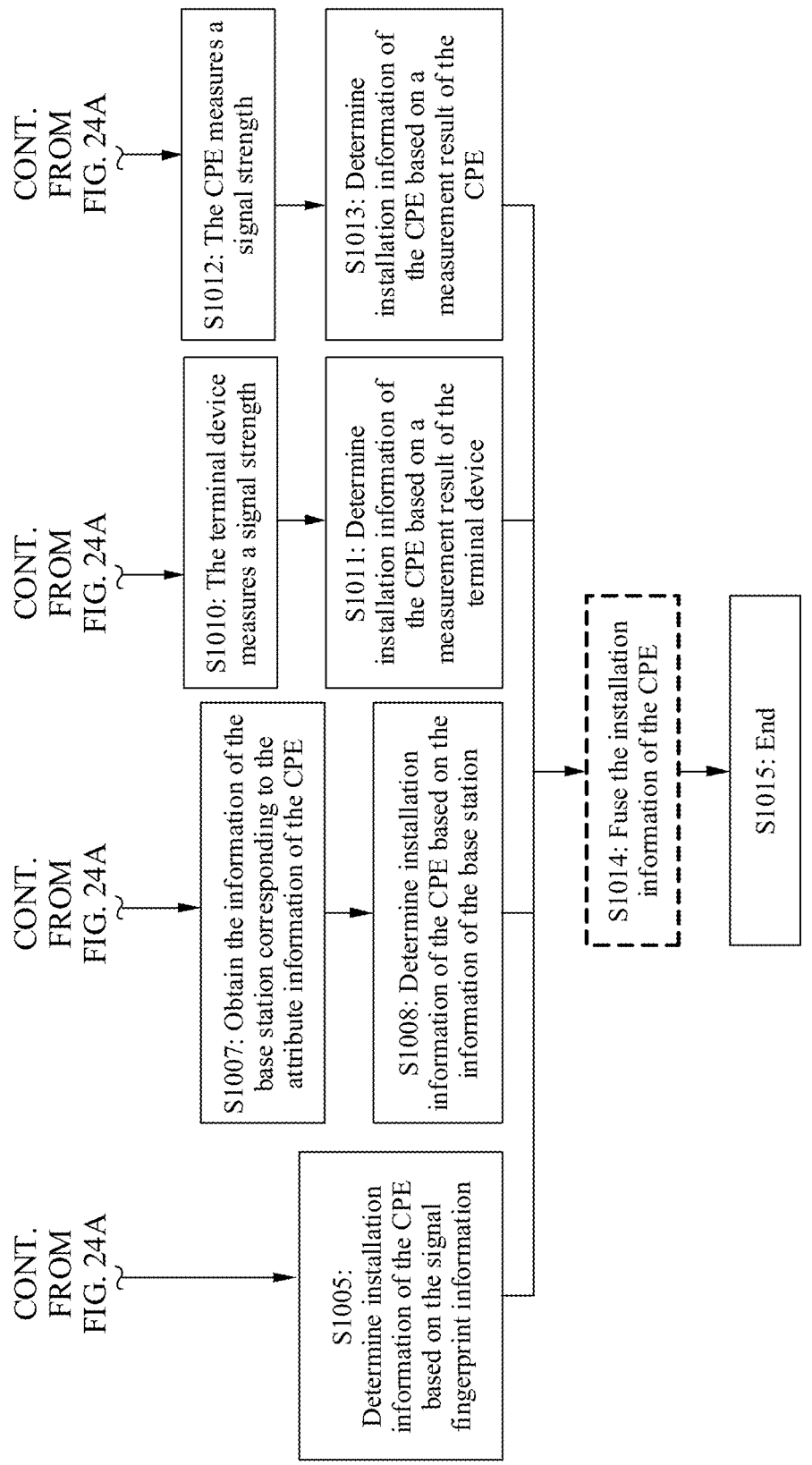

FIG. 24A and FIG. 24B are a schematic flowchart of an embodiment of a method for obtaining installation information of CPE according to an embodiment of the application. FIG. 24A and FIG. 24B show implementation logic of the method for obtaining installation information of CPE with reference to embodiments of this application. After S1000 starts, in S1001, the terminal device obtains attribute information of the CPE, and sends a request for obtaining installation information of CPE to a first server in S1002. For S1001 and S1002, refer to S21, S22, and S10 in the foregoing embodiment. Details are not described again.

Subsequently, in S1003, it needs to be determined whether there is signal fingerprint information having the same standard as the CPE on a side of the first server. A subject of the determining may be the first server, or may be another device. If yes, in S1004, it is further determined whether signal fingerprint information corresponding to CPE information exists on the side of the first server, that is, whether signal fingerprint information exists within a range with a radius of P shown in FIG. 13. Further, if yes, in S1005, the installation information of the CPE may be determined based on the signal fingerprint information in the manner (denoted in this paragraph as a first manner) shown in FIG. 13 of this application.

If a determining result in S1004 is no, S1006 is used to determine whether information of a base station corresponding to the attribute information of the CPE exists on the side of the first server, that is, whether a base station exists within a range with a radius of P shown in FIG. 14. Further, if yes, in S1007, the information of the base station corresponding to the attribute of the CPE is obtained, and in S1008, the installation information of the CPE is determined based on the information of the base station in the manner (denoted in this paragraph as a second manner) shown in FIG. 14.

If a determining result in S1003 is no, or a determining result in S1006 is no, S1009 is used to determine whether the terminal device and the CPE are in a same standard. If yes, in S1010, the terminal device measures a signal strength in the manner shown in FIG. 21. In S1011, the installation information of the CPE is determined based on a measurement result of the signal strength in the manner (denoted in this paragraph as a third manner) shown in FIG. 21.

If a determining result in S1003 is no, in S1012, the terminal device is connected to the CPE in the manner shown in FIG. 23, measures a signal strength by using the CPE, and in S1013, determines the installation information of the CPE based on a measurement result of the signal strength in the manner (denoted in this paragraph as a fourth manner) shown in FIG. 21.

Finally, the procedure may be ended in S1015 after S1005, S1008, S1011, or S1013.

Alternatively, in an embodiment, when using the terminal device to determine the installation information of the CPE, the user may separately obtain the installation information of the CPE in any one of the first to the fourth manners shown in FIG. 24A and FIG. 24B, and combine, in S1014 in an information fusion manner, the installation information of the CPE obtained in all manners. In this way, more accurate installation information is obtained. An embodiment of the fusion is to average all the obtained CPE installation information.

In an embodiment of the application, to enable the user to obtain the installation information of the CPE by using the terminal device, the terminal device should have at least a positioning function (which can obtain location information and determine a location of the terminal device in FIG. 9 or FIG. 10), or has a rotation detection function (determining a current direction of the terminal device in FIG. 9 or FIG. 10). Therefore, before performing the method for obtaining installation information of CPE in this application, the terminal device may further detect whether the terminal device supports the positioning function and/or the rotation detection function. If the terminal device supports the positioning function and/or the rotation detection function, the terminal device may perform the method for obtaining installation information of CPE provided in this application. If the terminal device does not support the positioning function and/or the rotation detection function, the terminal device may not perform the method for obtaining installation information of CPE provided in this application. In this case, the terminal device may prompt, by using a display interface, the user to install the CPE in a manual manner shown in 2.

Figure 25:
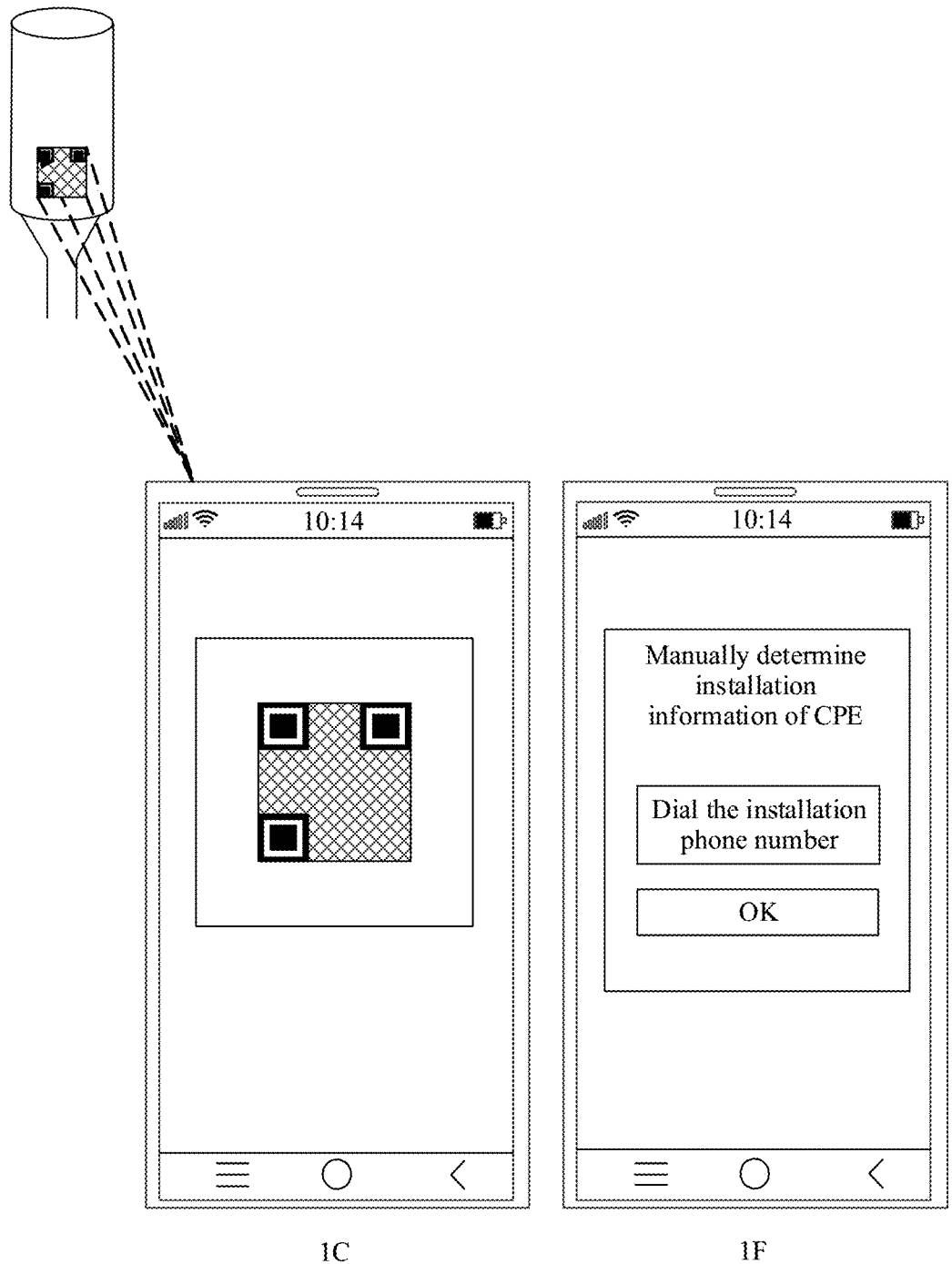
FIG. 25 is a schematic diagram of an embodiment of display interfaces of a terminal device according to an embodiment of the application.

For example, FIG. 25 is a schematic diagram of an embodiment of display interfaces of a terminal device according to an embodiment of this application. In an example shown in FIG. 25, after a user scans a two-dimensional code on CPE on a display interface 1C (for operations before the display interface 1C is displayed, refer to FIG. 6-1A to FIG. 6-1D or FIG. 7-1A' to FIG. 7-1C', and details are not described again), the terminal device may detect whether the terminal device has a positioning function and/or a rotation detection function. For example, the terminal device determines that no gyroscope is disposed on the terminal device, and rotation detection cannot be performed. Subsequently, the terminal device may prompt, in a form of a dialog box on a display interface 1F, the user with "Manually determine installation information of CPE", and may further provide a selection box of "Dial the installation phone number". After the user taps the selection box, the terminal device may dial the installation phone number, to request, in the manner shown in FIG. 2, installation personnel to install the CPE on site.

In addition, the terminal device may detect whether the terminal device has the positioning function and/or the rotation detection function before the operation of scanning the two-dimensional code shown in FIG. 25. For example, after performing detection when the terminal device is idle, the terminal device stores a detection result in storage space; and after the user scans the two-dimensional code on the display interface 1C shown in FIG. 25 by using the terminal device, the terminal device may determine, by using the detection result stored in the storage space, whether the terminal device has the positioning function and/or the rotation detection function.

In an embodiment, the supplier of the CPE expects the user to install, on the terminal device, an application such as "Smart Life", and use the application to scan the two-dimensional code on the CPE in the manner shown in FIG. 6-1A to FIG. 6-1D to obtain installation information. Because the application of "Smart Life" is also provided by the supplier of the CPE, security of the entire process and accuracy of the obtained information are ensured, and subsequent maintenance and information collection and feedback are facilitated. However, some users still scan the two-dimensional code on the CPE by using another application having a function "Scan" shown in FIG. 7-1A' to FIG. 7-1C'. In this case, after the user scans the two-dimensional code by using the another application, the terminal device may prompt the user to obtain the installation information of the CPE by using the application "Smart Life".

For example, FIG. 26 is a schematic diagram of an embodiment of display interfaces of a terminal device according to an embodiment of this application. In an example shown in FIG. 25, after a user uses an application other than "Smart Life" to scan the two-dimensional code on the CPE on a display interface 1C (for operations before the display interface 1C is displayed, refer to FIG. 6-1A to FIG. 6-1D or FIG. 7-1A' to FIG. 7-1C', and details are not described again), the terminal device further prompts, on a display interface 1G in a form of a dialog box, the user to install the application "Smart Life", and a button "Install" is displayed. After the user taps the button "Install" on the display interface 1G, the terminal device may obtain an application installation package through the Internet, install the application "Smart Life", and automatically open the application on a display interface 1H after the installation is completed. Next, the user may obtain the installation information of the CPE in the application "Smart Life" in the operation manner shown in FIG. 6-1A to FIG. 6-1D.

In still another embodiment, after the application "Smart Life" has been installed on the terminal device, but the user still uses another application other than "Smart Life" to scan the two-dimensional code on the CPE on the display interface 1C (for operations before the display interface 1C is displayed, refer to FIG. 6-1A to FIG. 6-1D or FIG. 7-1A' to FIG. 7-1C', and details are not described again), the terminal device may directly open the installed application "Smart Life", and directly display a display interface 1H (in this implementation, because the application "Smart Life" has been installed, the display interface 1G is not displayed). Then, the user may obtain the installation information of the CPE in the application "Smart Life" in the operation manner shown in FIG. 6-1A to FIG. 6-1D.

Further, for the application "Smart Life" installed on the terminal device, the CPE device may be further managed by using functions such as binding and combination provided by the application. The binding may be performed before the installation information of the CPE is obtained. For example, FIG. 27-1H, FIG. 27-1J, FIG. 27-1K, and FIG.

27-1D are schematic diagrams of an embodiment of display interfaces of a terminal device according to an embodiment of this application. In an example shown in FIG. 27-1H, FIG. 27-1J, FIG. 27-1K, and FIG. 27-1D, on a display interface of an application "Smart Life" displayed on a display interface 1H, a home of a user "ABC" has been bound to a device 1 (for example, a router or a sound box) and a device 2. The user may tap "Add a device" and enter CPE information; then, on a display interface 1J, it can be seen that the home of the user "ABC" has been bound to three devices including the CPE; and in this case, after the user taps a button corresponding to the CPE, the terminal device may display related functions of the CPE on a display interface 1K, for example, a button "Obtain installation information". After the user taps the button "Obtain installation information", the terminal device may perform the method described in any embodiment of this application to obtain the installation information of the CPE bound to the terminal device, and finally display the installation information in a display interface 1D.

In an embodiment, in the display interface shown in FIG. 27-1K, buttons for the functions related to the CPE further include a button "Installation tutorial". The supplier of the CPE may record, in a video manner, operations that need to be performed by the user in a process of installing the CPE. After the user taps the button "Installation tutorial" button on the display interface 1K, the terminal device may obtain an installation video through a network and play the installation video, or the terminal device may obtain an installation video stored in the terminal device and play the installation video.

In an embodiment, on the display interface shown in FIG. 27-1K, buttons of functions related to the CPE further include a button "Select an installation manner", and the installation manner of the CPE includes: wall-mounted installation, pole-mounted installation, and the like. After the user selects the installation manner such as wall-mounted installation or pole-mounted installation, the terminal device may perform recording, and after the user subsequently taps the installation tutorial, an installation video corresponding to the wall-mounted installation or pole-mounted installation manner is obtained for playing. In addition, because the installation manner determines subsequent design of a plurality of functions and parameters, after the user binds the CPE or the user scans the two-dimensional code, the terminal device may display a selection box popped up on the display interface to enable the user to select an installation manner, and record the installation manner selected by the user.

In addition, in the embodiments shown in FIG. 9 and FIG. 10 of this application, after the user determines the installation information of the CPE by using the terminal device, the terminal device may indicate, by using the display interfaces, the user to move toward the installation location and the installation angle. However, if the user does not move according to the indication of the terminal device, but moves to another location, to ensure accuracy of indicating the user, the terminal device may send a request for obtaining installation information of the CPE to the network device in the manner shown in FIG. 4 again after a movement distance of the user is greater than a preset distance (for example, 10 meters), and the terminal device receives the installation information of the CPE sent by the network device again; or the terminal device may prompt the user to obtain the installation information of the CPE again, where the installation information of the CPE may be re-obtained automatically, or may be re-obtained by responding to an operation of the user (for example, tapping a button for re-obtaining the installation information) to perform the method shown in FIG. 4.

For example, FIG. 28 is a schematic diagram of an embodiment of display interfaces of a terminal device according to an embodiment of this application. In an example shown in FIG. 28, a button "Obtain installation information again" may be added to a display interface 4B that is based on the display interface 4B shown in FIG. 10. After a user moves more than 10 meters, the user may be prompted, by the button, to obtain the installation information again. After the user taps the button on the display interface 4B, the terminal device determines the installation information of the CPE by using a display interface 4A by using the method in any one of the foregoing embodiments of this application again, and displays the installation information on the display interface 4B.

In an embodiment, in the example shown in FIG. 28, the terminal device may not display the button in the display interface 4B, but automatically re-obtain the installation information of the CPE after detecting that the movement distance exceeds 10 meters, which reduces a tap operation of the user.

In an embodiment of the application, at least two implementations of displaying the installation information of the CPE by the terminal device are provided: displaying the installation information of the CPE through text (the display interface 1D in FIG. 6-1A to FIG. 6-1D) and displaying the installation information of the CPE through graphics (FIG. 9 and FIG. 10). Therefore, to enrich personalized selection experience of the user, the terminal device may also display the installation information of the CPE in different manners according to the selection of the user.

Figure 29:
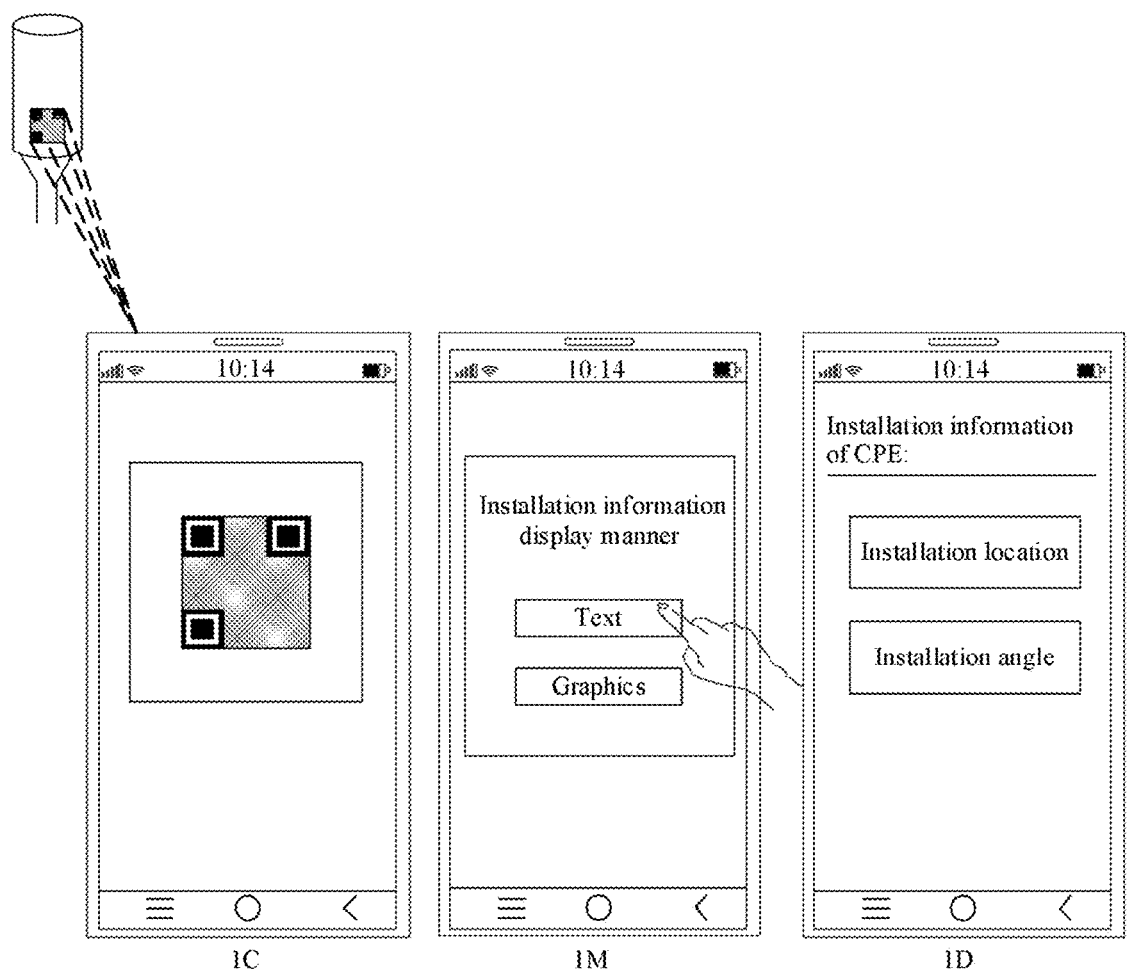
FIG. 29 is a schematic diagram of an embodiment of display interfaces of a terminal device according to an embodiment of the application.

For example, FIG. 29 is a schematic diagram of an embodiment of display interfaces of a terminal device according to an embodiment of this application. In an example shown in FIG. 28, after a user scans a two-dimensional code on CPE by using the terminal device, the terminal device obtains installation information of the CPE by using the method in any embodiment of this application. Subsequently, in a display interface 1M, the terminal device prompts, in a form of a dialog box, the user to select a manner of displaying the installation information, for example, "Text" and "Graphics". After the user taps the button "Text" in the display interface 1M, the terminal device may display the installation information of the CPE in a display interface 1D through text; or after the user taps the button "Graphics", the terminal device may display the installation information of the CPE in the manner shown in FIG. 9 or FIG. 10.

In the foregoing embodiments, the method for obtaining installation information of CPE according to embodiments of this application is described. To implement functions in the method according to the embodiments of this application, the terminal device and the network device that are used as execution bodies may include a hardware structure and/or a software module, and implement the functions in a form of the hardware structure, the software module, or a combination of the hardware structure and the software module. Whether a function in the foregoing functions is performed in the form of the hardware structure, the software module, or both the hardware structure and the software module depends on applications and design constraint conditions of the technical solutions.

Figure 30:
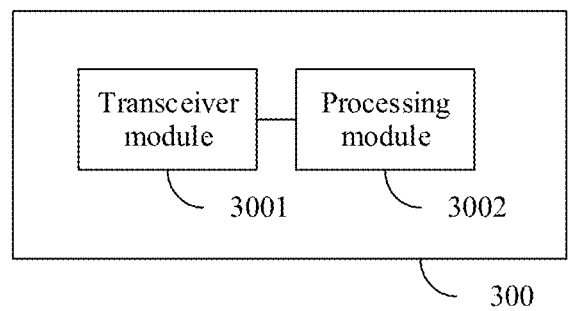
FIG. 30 is a schematic diagram of a structure of an embodiment of an apparatus for obtaining installation information of CPE according to an embodiment of the application.

For example, FIG. 30 is a schematic diagram of a structure of an embodiment of an apparatus for obtaining installation information of CPE according to an embodiment of the application. The apparatus 3000 shown in FIG. 30 may be used as a terminal device in any embodiment of this application, and perform a method that is performed by the terminal device, or may be used as a network device in any embodiment of this application, and perform a method that is performed by the network device. For example, the apparatus for obtaining installation information of CPE shown in FIG. 30 includes a transceiver module 3001 and a processing module 3002.

For example, when the apparatus for obtaining installation information of CPE shown in FIG. 30 serves as a terminal device and is configured to perform the method that is performed by the terminal device in any embodiment of this application, the transceiver module 3001 is configured to send a request for obtaining installation information of CPE to a network device. The request for obtaining the installation information of the CPE includes positioning data of the terminal device. The transceiver module 3001 is further configured to receive the installation information of the CPE that is sent by the network device. The installation information of the CPE is used to indicate at least one of the following: an installation location of the CPE and an installation angle of the CPE, and the installation location of the CPE and the installation angle of the CPE are determined by the network device based on the positioning data. The processing module 3002 is configured to display the installation information of the CPE on a display interface.

In an embodiment, the processing module 3002 is configured to display, on the display interface, a first icon used to indicate a movement direction from a location of the terminal device to the installation location, and/or a second icon used to indicate a rotation direction from an angle toward which the terminal device faces to the installation angle.

In an embodiment, the processing module 3002 is further configured to: when the location of the terminal device changes, update, according to the change of the location, the first icon displayed on the display interface; and/or when the angle toward which the terminal device faces changes, update, according to the change of the angle, the second icon displayed on the display interface.

In an embodiment, the processing module 3002 is further configured to display installation confirmation information of the CPE on the display interface when the terminal device moves to the installation location and rotates to the installation angle.

In an embodiment, after the processing module 3002 determines that the terminal device receives the installation information of the CPE that is sent by the network device, if a movement distance exceeds a preset distance, the transceiver module 3001 is further configured to send a request for obtaining installation information of the CPE to the network device again, and receive the installation information of the CPE that is sent by the network device again.

In an embodiment, the request for obtaining the installation information of the CPE further includes attribute information of the CPE. As shown in FIG. 30, the apparatus further includes a scanning module and/or an input module. The scanning module is configured to obtain the attribute information of the CPE by scanning a graphic identification code provided on the CPE. The input module is configured to obtain the attribute information of the CPE by receiving data entered by a user.

In an embodiment, the attribute information of the CPE includes at least one of the following: identification information of the CPE, a public land mobile network PLMN to which a subscriber identity module SIM card used by the CPE belongs, a tracking area code TAC of a location of the CPE, a radio access technology RAT type supported by the CPE, a device model of the CPE, device capability information of the CPE, and an installation range specified by the user of the CPE.

In an embodiment, the request for obtaining the installation information of the CPE further includes information used to indicate a relative location between the terminal device and a target object; and the installation information of the CPE is further used to indicate a relative installation location between the CPE and the target object.

For a working manner and principle of the apparatus shown in FIG. 30 when the apparatus is used as the terminal device, refer to the descriptions of the terminal device in the foregoing method in this application. Details are not described again.

For another example, when the apparatus for obtain installation information of CPE shown in FIG. 30 serves as a terminal device and is configured to perform the method that is performed by the terminal device in any embodiment of this application, the transceiver module 3001 is configured to receive a request for obtaining installation information of CPE that is sent by the terminal device. The request for obtaining the installation information of the CPE includes positioning data of the terminal device. The processing module 3002 is configured to determine the installation information of the CPE based on the positioning data and the attribute information of the CPE. The installation information of the CPE is used to indicate at least one of the following: an installation location of the CPE and an installation angle of the CPE. The transceiver module 3001 is further configured to send the installation information of the CPE to the terminal device.

In an embodiment, the request for obtaining the installation information of the CPE further includes the attribute information of the CPE.

In an embodiment, the attribute information of the CPE includes at least one of the following: identification information of the CPE, a public land mobile network PLMN to which a subscriber identity module SIM card used by the CPE belongs, a tracking area code TAC of a location of the CPE, a radio access technology RAT type supported by the CPE, a device model of the CPE, device capability information of the CPE, and an installation range specified by the user of the CPE.

In an embodiment, the processing module 3002 is configured to: obtain, based on the positioning data and within a preset range of a location of the terminal device, signal strength information reported by at least one device corresponding to the attribute information of the CPE; determine, based on the signal strength information reported by the at least one device, direction information and a signal strength that are of at least one base station corresponding to the location of the terminal device; and determine, based on the direction information and the signal strength information that are of the at least one base station, that the installation information of the CPE is location information of a target location point and information about an angle between a direction toward which the target location point faces and a target base station. The target location point is a location point that has a maximum signal strength, that is of the at least one base station, and that is within the installation range specified by the user of the CPE and within the preset range.

In an embodiment, the processing module 3002 is configured to: obtain, based on the positioning data and within a preset range of a location of the terminal device, location information of at least one base station corresponding to the attribute information of the CPE; and determine, based on the location information of the at least one base station, that the installation information of the CPE is location information of a target location point and information about an angle between a direction toward which the target location point faces and a target base station. The target location point is a location that is closest to the at least one base station and that is within the installation range specified by the user of the CPE and within the preset range.

In an embodiment, the request for obtaining the installation information of the CPE further includes information used to indicate a relative location between the terminal device and a target object; and the installation information of the CPE is further used to indicate a relative installation location between the CPE and the target object.

For a working manner and principle of the apparatus shown in FIG. 30 when the apparatus is used as the network device, refer to the description of the network device in the foregoing method in this application. Details are not described again.

It should be noted and understood that division into the modules of the foregoing apparatus is merely logic function division. In an embodiment, a part or all of modules may be integrated into one physical entity, or the modules may be physically separated. In addition, all these modules may be implemented in a form of software invoked by a processor element, or may be implemented in a form of hardware. Alternatively, a part of modules may be implemented in a form of software invoked by a processor element, and a part of modules are implemented in a form of hardware. For example, the processing module may be a separately disposed processor element, or may be integrated into a chip of the foregoing apparatus for implementation. In addition, the processing module may alternatively be stored in a memory of the foregoing apparatus in a form of program code, and a processor element of the foregoing apparatus invokes and executes a function of the foregoing determining module. An implementation of another module is similar to the implementation of the processing module. In addition, all or some of these modules may be integrated together, or may be implemented independently. The processor element herein may be an integrated circuit and has a signal processing capability. In an implementation process, operations in the foregoing methods or the foregoing modules may be implemented by using a hardware integrated logic circuit in the processor element, or by using instructions in a form of software.

For example, the foregoing modules may be configured as one or more integrated circuits for implementing the foregoing methods, such as one or more application-specific integrated circuits (ASIC), one or more microprocessors (DSP), or one or more field programmable gate arrays (FPGAs). For another example, when one of the foregoing modules is implemented by scheduling program code by a processor element, the processor element may be a general-purpose processor, for example, a central processing unit (CPU) or another processor that can invoke the program code. For another example, these modules may be integrated together and implemented in a form of a system-on-a-chip (SOC).

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive (SSD)), or the like.

Figure 31:
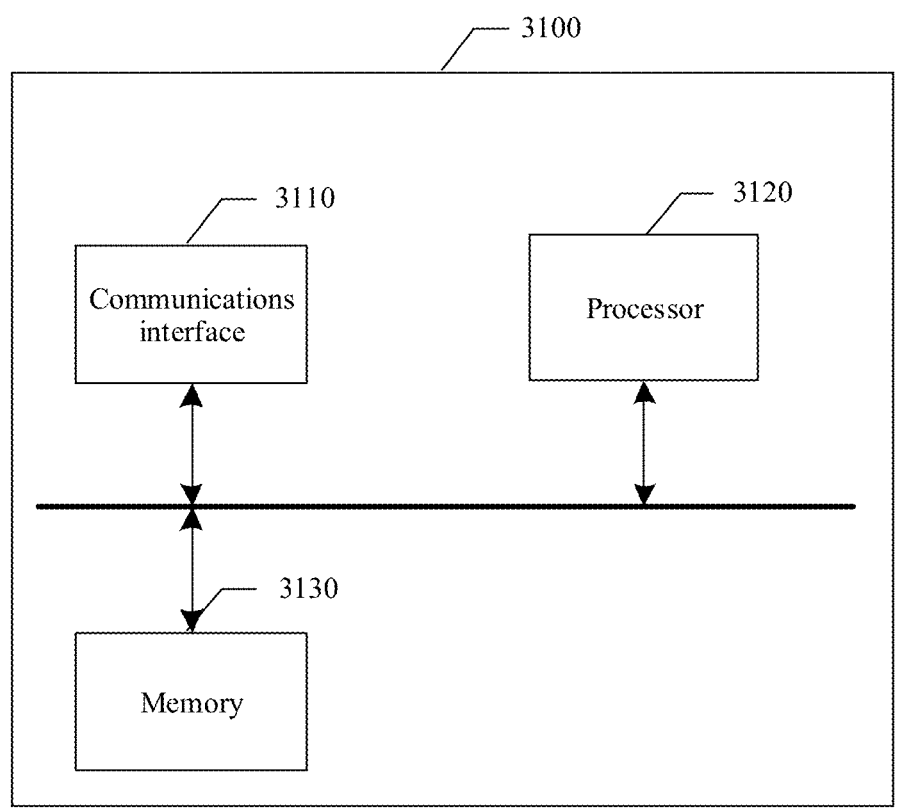
FIG. 31 is a schematic diagram of a structure of a communications apparatus according to an embodiment of the application.

In addition, an embodiment of this application further provides another structure of a computing apparatus that can be applied to the terminal device or the network device provided in this application. FIG. 31 is a schematic diagram of a structure of a communications apparatus according to an embodiment of the application. As shown in FIG. 31, the computing apparatus 3100 may include a communications interface 3110 and a processor 3120. In an embodiment, the computing apparatus 3100 may further include a memory 3130. The memory 3130 may be disposed inside or outside the computing apparatus.

For example, all actions performed by the terminal device in the foregoing embodiments of this application may be implemented by the processor 3120. The processor 3120 sends data through the communications interface 3110. In an implementation process, operations in a processing procedure may be implemented by using an integrated logic circuit of hardware in the processor 3120 or in instructions in a form of software, to complete the method performed by the terminal device. For brevity, details are not described herein again. Program code executed by the processor 3120 to implement the methods may be stored in the memory 3130. The memory 3130 and the processor 3120 are in a connection such as a coupled connection.

For another example, all actions performed by the network device in the foregoing embodiments of this application may be implemented by the processor 3120. The processor 3120 sends a control signal and communications data through the communications interface 3110, and is configured to implement any method performed by the network device. In an implementation process, operations in a processing procedure may be implemented by using an integrated logic circuit of hardware in the processor 3120 or in instructions in a form of software, to complete the method performed by the network device. For brevity, details are not described herein again. Program code executed by the processor 3120 to implement the methods may be stored in the memory 3130. The memory 3130 and the processor 3120 are in a connection such as a coupled connection.

Some features in this embodiment of this application may be implemented/supported by the processor 3120 by executing the program instructions or software code in the memory 3130. Software components being loaded in the memory 3130 may be summarized in terms of function or logic, for example, the transceiver module 3001 and the processing module 3002 shown in FIG. 30.

Any communications interface in the embodiments of this application may be a circuit, a bus, a transceiver, or any other apparatus that may be configured to exchange information, for example, the communications interface 3110 in the computing apparatus 3100. For example, the another apparatus may be a device connected to the computing apparatus. For example, when the computing apparatus is a terminal device, the another apparatus may be a network device; or when the computing apparatus is a network device, the another apparatus may be a terminal device.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in embodiments of this application. The general-purpose processor may be a microprocessor, any conventional processor, or the like. The operations of the method disclosed with reference to embodiments of this application may be directly performed by a hardware processor, or may be performed by using a combination of hardware in the processor and a software module.

Couplings in this embodiment of this application are indirect couplings or communication connections between apparatuses, modules, or modules, may be implemented in electrical, mechanical, or other forms, and are used for information exchange between the apparatuses, the modules, or the modules.

The processor may cooperate with the memory. The memory may be a nonvolatile memory such as a hard disk drive (HDD) or a solid-state drive (solid-state drive, SSD), or may be a volatile memory such as a random access memory (RAM). The memory is any other medium that can carry or store expected program code in a form of an instruction or a data structure and that can be accessed by a computer, but is not limited thereto.

A connection medium among the communications interface, the processor, and the memory is not limited in this embodiment of this application. For example, the memory, the processor, and the communications interface may be connected by using a bus. The bus may be classified into an address bus, a data bus, a control bus, and the like. Certainly, the connection bus between the processor and the memory is not the connection bus between the terminal device and the network device.

In embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" generally indicates an "or" relationship between the associated objects. In a formula, the character "/" indicates a "division" relationship between the associated objects. At least one of the following items (pieces) or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It may be understood that various numeric numbers in embodiments of this application are merely for differentiation for ease of description, and are not intended to limit the scope of embodiments of this application. It may be understood that, in the embodiments of this application, sequence numbers of the foregoing processes do not mean execution sequences. The execution sequences of the processes should be determined based on functions and internal logic of the processes, and should not constitute any limitation on the implementation processes of the embodiments of this application.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method for obtaining installation information of a network access device, comprising:
   sending, by a terminal device, a request for obtaining installation information of the network access device to a network device, wherein the request for obtaining the installation information of the network access device comprises positioning data of the terminal device;
   receiving, by the terminal device, the installation information of the network access device sent by the network device, wherein the installation information of the network access device is used to indicate an installation location of the network access device and an installation angle of the network access device, wherein the installation location of the network access device and the installation angle of the network access device are determined by the network device based on the positioning data; and
   displaying, by the terminal device, the installation information of the network access device on a display interface.

2. The method according to claim 1, wherein the displaying the installation information of the network access device on the display interface comprises:
   displaying, by the terminal device on the display interface, a first icon used to indicate a movement direction from a location of the terminal device to the installation location, and/or a second icon used to indicate a rotation direction from an angle toward which the terminal device faces to the installation angle.

3. The method according to claim 2, wherein after the displaying the installation information of the network access device on the display interface, the method further comprises:
   updating, by the terminal device according to a change of the location of the terminal device, the first icon displayed on the display interface when the location of the terminal device changes; and/or
   updating, by the terminal device according to a change of the angle towards which the terminal device faces, the second icon displayed on the display interface when the angle toward which the terminal device faces changes.

4. The method according to claim 1, further comprising:
   displaying, by the terminal device, installation confirmation information of the network access device on the display interface when the terminal device moves to the installation location and rotates to the installation angle.

5. The method according to claim 1, further comprising:
after the terminal device receives the installation information of the network access device sent by the network device, if a movement distance exceeds a preset distance, sending, by the terminal device, a request for obtaining installation information of the network access device to the network device again, and receiving the installation information of the network access device by the network device again.

6. The method according to claim 1, wherein
the request for obtaining the installation information of the network access device further comprises attribute information of the network access device; and
before the sending, by the terminal device, the request for obtaining installation information of the network access device to the network device, the method further comprises:
obtaining, by the terminal device, the attribute information of the network access device by scanning a graphic identification code provided on the network access device;
and/or obtaining, by the terminal device, the attribute information of the network access device by receiving data entered by a user.

7. The method according to claim 6, wherein the attribute information of the network access device comprises at least one of the following: identification information of the network access device, a public land mobile network (PLMN) to which a subscriber identity module (SIM) card used by the network access device belongs, a tracking area code (TAC) of a location of the network access device, a radio access technology (RAT) type supported by the network access device, a device model of the network access device, device capability information of the network access device, or an installation range specified by the user of the network access device.

8. The method according to claim 1, wherein
the request for obtaining the installation information of the network access device further comprises information used to indicate a relative location between the terminal device and a target object; and
the installation information of the network access device is further used to indicate a relative installation location between the network access device and the target object.

9. The method according to claim 1, wherein
the network access device is configured to receive a cellular signal, convert the cellular signal into an Ethernet signal or a wireless fidelity Wi-Fi signal, and output the Ethernet signal or the Wi-Fi signal; and/or
the network access device comprises customer premises equipment CPE.

10. A method for obtaining installation information of a network access device, comprising:
receiving, by a network device, a request for obtaining installation information of the network access device sent by a terminal device, wherein the request for obtaining the installation information of the network access device comprises positioning data of the terminal device;
determining, by the network device, the installation information of the network access device based on the positioning data and attribute information of the network access device, wherein the installation information of the network access device is used to indicate an installation location of the network access device and an installation angle of the network access device; and
sending, by the network device, the installation information of the network access device to the terminal device.

11. The method according to claim 10, wherein
the request for obtaining the installation information of the network access device further comprises the attribute information of the network access device.

12. The method according to claim 10, wherein
the attribute information of the network access device comprises at least one of the following: identification information of the network access device, a public land mobile network (PLMN) to which a subscriber identity module (SIM) card used by the network access device belongs, a tracking area code (TAC) of a location of the network access device, a radio access technology (RAT) type supported by the network access device, a device model of the network access device, device capability information of the network access device, or an installation range specified by a user of the network access device.

13. The method according to claim 10, wherein the determining the installation information of the network access device based on the positioning data and attribute information of the network access device comprises:
obtaining, by the network device based on the positioning data and within a preset range of a location of the terminal device, signal strength information reported by at least one device corresponding to the attribute information of the network access device;
determining, by the network device based on the signal strength information reported by the at least one device, direction information and a signal strength of at least one base station corresponding to the location of the terminal device; and
determining, by the network device based on the direction information and the signal strength of the at least one base station, wherein the installation information of the network access device is location information of a target location point and information about an angle between a direction toward which the target location point faces and a direction of arrival of a target base station, wherein the target location point is a location point having a maximum signal strength of the at least one base station, and that is within an installation range specified by a user of the network access device and within the preset range.

14. The method according to claim 10, wherein the determining the installation information of the network access device based on the positioning data and attribute information of the network access device comprises:
obtaining, by the network device based on the positioning data and within a preset range of a location of the terminal device, location information of at least one base station corresponding to the attribute information of the network access device; and
determining, by the network device based on the location information of the at least one base station, that the installation information of the network access device is location information of a target location point and information about an angle between a direction toward which the target location point faces and a direction of arrival of a target base station, wherein the target location point is a location closest to the at least one base station and within an installation range specified by a user of the network access device and within the preset range.

15. The method according to claim 10, wherein
the request for obtaining the installation information of the network access device further comprises information used to indicate a relative location between the terminal device and a target object; and
the installation information of the network access device is further used to indicate a relative installation location between the network access device and the target object.

16. The method according to claim 10, wherein
the network access device is configured to receive a cellular signal, convert the cellular signal into an Ethernet signal or a wireless fidelity Wi-Fi signal, and output the Ethernet signal or the Wi-Fi signal; and/or
the network access device comprises customer premises equipment CPE.

17. A terminal device, comprising:
a processor; and
a memory coupled to the processor to store instructions, which when executed by the processor, cause the terminal device to perform operations, the operations comprising:
sending a request for obtaining installation information of a network access device to a network device, wherein the request for obtaining the installation information of the network access device comprises positioning data of the terminal device;
receiving the installation information of the network access device sent by the network device, wherein the installation information of the network access device is used to indicate an installation location of the network access device and an installation angle of the network access device, wherein the installation location of the network access device and the installation angle of the network access device are determined by the network device based on the positioning data; and
displaying the installation information of the network access device on a display interface.

18. The terminal device according to claim 17, the displaying the installation information of the network access device on the display interface comprises:
displaying, on the display interface, a first icon used to indicate a movement direction from a location of the terminal device to the installation location, and/or a second icon used to indicate a rotation direction from an angle toward which the terminal device faces to the installation angle.

19. The terminal device according to claim 18, wherein after the displaying the installation information of the network access device on the display interface, the operations further comprising:
updating, according to a change of the location of the terminal device, the first icon displayed on the display interface when the location of the terminal device changes; and/or
updating, according to a change of the angle towards which the terminal device faces, the second icon displayed on the display interface when the angle toward which the terminal device faces changes.

20. The terminal device according to claim 17, the operations further comprising:
displaying installation confirmation information of the network access device on the display interface when the terminal device moves to the installation location and rotates to the installation angle.

* * * * *